(12) United States Patent
Zhi et al.

(10) Patent No.: US 12,550,215 B2
(45) Date of Patent: Feb. 10, 2026

(54) NETWORK CONNECTION METHOD, SYSTEM, AND RELATED APPARATUS

(71) Applicant: Huawei Technologies Co., Ltd., Shenzhen (CN)

(72) Inventors: Gang Zhi, Shenzhen (CN); Kai Yuan, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 441 days.

(21) Appl. No.: 18/007,383

(22) PCT Filed: Jul. 29, 2021

(86) PCT No.: PCT/CN2021/109371
§ 371 (c)(1),
(2) Date: Jan. 30, 2023

(87) PCT Pub. No.: WO2022/022653
PCT Pub. Date: Feb. 3, 2022

(65) Prior Publication Data
US 2023/0276518 A1    Aug. 31, 2023

(30) Foreign Application Priority Data

Jul. 31, 2020    (CN) .......................... 202010761966.2

(51) Int. Cl.
*H04W 76/16*    (2018.01)
*H04W 76/30*    (2018.01)

(52) U.S. Cl.
CPC .......... *H04W 76/16* (2018.02); *H04W 76/30* (2018.02)

(58) Field of Classification Search
CPC .............................. H04W 48/16; H04W 76/30
See application file for complete search history.

(56) References Cited

U.S. PATENT DOCUMENTS

| 2020/0229076 A1* | 7/2020 | Jin ........................ H04W 48/14 |
| 2021/0266800 A1* | 8/2021 | He ........................ H04W 76/15 |

FOREIGN PATENT DOCUMENTS

| CN | 107306170 A | 10/2017 |
| CN | 110536348 A | 12/2019 |

(Continued)

OTHER PUBLICATIONS

3GPP TSG-RAN WG2 Meeting #109 electronic R2-2000255, "Reporting UE Assistance Info to NR SN" CATT, Elbonia, Feb. 25-Mar. 6, 2020, 37 pages.

(Continued)

*Primary Examiner* — Elton Williams
(74) *Attorney, Agent, or Firm* — Conley Rose, P.C.

(57) ABSTRACT

An electronic device performs data exchange with a network side device through a Long-Term Evolution (LTE) link. When the electronic device meets a first preset condition, the electronic device actively sends first user equipment (UE) assistance information to the network side device. The first UE assistance information includes a first field. An uplink secondary component carrier count (reducedCCsUL) sub-information element carried in the first field is a first value or the first field does not carry any sub-information element. The first value is greater than 0. In response to the first UE assistance information, the network side device establishes a new radio (NR) link to the electronic device.

21 Claims, 17 Drawing Sheets

(56) References Cited

FOREIGN PATENT DOCUMENTS

| WO | 2018130115 A1 | 7/2018 |
| WO | 2019095254 A1 | 5/2019 |
| WO | 2021030422 A1 | 2/2021 |

OTHER PUBLICATIONS

3GPP TSG-RAN2 WG2 Meeting #107bis R2-1912377, "Running CR to TS 38.331 for 5G V2X with NR sidelink", Huawei, HiSilicon, ChongQing, China, Oct. 14-18, 2019, 73 pages.

3GPP TSG-RAN WG2 Meeting #107bis R2-1912467, "UE Assistance Information for EN-DC," Apple, Chongqing, China, Oct. 14-18, 2019, 2 pages.

* cited by examiner

NETWORK CONNECTION METHOD, SYSTEM, AND RELATED APPARATUS

This is a U.S. National Stage of International Patent Application No. PCT/CN2021/109371, filed on Jul. 29, 2021, which claims priority to Chinese Patent Application No. 202010761966.2, filed on Jul. 31, 2020. Both of the aforementioned applications are hereby incorporated by reference in their entireties.

TECHNICAL FIELD

This application relates to the field of communications technologies, and in particular, to a network connection method, a system, and a related apparatus.

BACKGROUND

In LTE, a concept of dual connectivity is introduced in an R12 standard, that is, user equipment (user equipment, UE) in a radio resource control (radio resource control, RRC) connected state may simultaneously perform transmission by using independent physical resources of two base stations. An LTE dual connectivity technology expands application of carrier aggregation, and can effectively increase a network capacity and improve a network handover success rate, and the like.

At an early stage of deployment of a new radio (new radio, NR) network of a fifth generation mobile network (5th generation mobile network, 5G), a non-standalone (non-standalone) networking manner is a manner selected by most operators around the globe.

The NSA networking manner is also referred to as a 4G-5G radio access dual connectivity (EUTRN-NR dual connectivity, EN-DC), and mainly relates to a 4G E-UTRAN access network (also referred to as an LTE access network) and a 5G new random access technology (new random access technology, NR) access network (referred to as an NR access network for short), so that the 5G network can use LTE coverage of the existing 4G during deployment, to avoid a waste of network resources.

In the EN-DC networking manner, the UE may be connected to both a 4G base station (which may be referred to as an eNB) and a 5G base station (which may be referred to as an En-gNB), to obtain a high-rate and low-latency wireless transmission service under tight interoperation between 4G and 5G. Compared with a single access network working mode (for example, communication using only the LTE technology of 4G), a dual access network working mode of an electronic device (for example, communication using both the LTE technology of 4G and a 5G technology) cause high power consumption of the UE. In addition, for some scenarios with low network usage requirements, the LTE access network can ensure a network connection requirement of the electronic device. The electronic device such as a smartphone frequently switches between a scenario with a high network speed requirement and a scenario with a low network speed requirement. If the LTE-NR dual connectivity technology is still used, network resources are wasted and power consumption of the electronic device is increased.

SUMMARY

This application provides a network connection method and a related apparatus, so that a network side may be indicated, by using a field such as an overheating (overheating) protection field or a maximum secondary component carrier (maxCC) field in UE assistance information, to quickly establish an NR link connection or release the NR link connection.

According to a first aspect, this application provides a network connection system, including an electronic device and a network side device. The electronic device is configured to perform data exchange with the network side device through a long term evolution LTE link. The electronic device is further configured to: when the electronic device meets a first preset condition, actively send first UE assistance information to the network side device. The first user equipment UE assistance information includes a first field, and an uplink secondary component carrier count reducedCCsUL sub-information element carried in the first field is a first value or the first field does not carry any sub-information element. The first value is greater than 0. The network side device is configured to: in response to the first UE assistance information, establish a new radio NR link to the electronic device. The electronic device is configured to perform data exchange with the network side device through both the LTE link and the NR link.

According to the network connection system provided in this application, the electronic device may send the UE assistance information to the network side, to trigger the network side to quickly establish an NR link connection to the electronic device or release the NR link connection. Specifically, a field such as an overheating (overheating) protection field or a maximum secondary component carrier (maxCC) field in the UE assistance information may be used to indicate the network side to establish the NR link connection or release the NR link connection. In this way, when the electronic device needs to release an NR connection in an LTE-NR dual connectivity, the network side is quickly triggered to release an NR SCG, to reduce power consumption. When the electronic device needs to establish the LTE-NR dual connectivity in a case of a single LTE connectivity, the electronic device may quickly trigger the network side to add an NR SCG, to quickly resume the LTE-NR dual connectivity and improve a data transmission rate.

1. A protocol version of the first UE assistance information may be the 3rd Generation Partnership Project 3GPP technical protocol specification R14 version or R15 version, and the first field is the overheating (overheating) protection field. 2. A protocol version of the first UE assistance information may be the 3GPP technical protocol specification R16 version, and the first field is the maximum secondary component carrier count maxCC field.

In a possible implementation, the network side device is further configured to: in response to the first UE assistance information, activate N uplink secondary component carriers of the electronic device, where N is the first value. The electronic device is specifically configured to: send data to the network side device by using both an uplink primary component carrier on the LTE link and the N uplink secondary component carriers on the NR link.

In a possible implementation, the electronic device is further configured to: before performing data exchange with the network side through the LTE link, perform data exchange with the network side device through both the LTE link and the NR link; and when the electronic device meets a second preset condition, actively send secondary cell group failure (SCG failure) signaling to the network side device. The network side device is further configured to: in response to the SCG failure signaling, release the NR link to the electronic device. The electronic device is further configured to: after releasing the NR link, disable NR measurement.

In this way, when the electronic device has established the LTE-NR dual connectivity, if the electronic device detects that the NR link needs to be released, the electronic device may report the SCG failure signaling to the network side, to trigger the network side to release the NR link. After the NR link is disconnected and the electronic device is single-connected to an LTE access network device, if the electronic device detects that the LTE-NR dual connectivity needs to be established, the electronic device may report the first UE assistance information to the network side, to trigger the network side to quickly establish the NR link to the electronic device. The uplink component carrier count (reducedCCsUL) sub-information element carried in the overheating field in the first UE assistance information is not 0 or the overheating field does not carry any sub-information element. In this way, the electronic device can be switched from an LTE single connectivity to the LTE-NR dual connectivity in time, without interrupting a data service, so that a risk of paging loss is reduced.

In a possible implementation, the electronic device is further configured to: before performing data exchange with the network side through the LTE link, perform data exchange with the network side device through both the LTE link and the NR link; and when the electronic device meets a second preset condition, actively send second UE assistance information to the network side device. The second UE assistance information includes the overheating field, and an uplink secondary component carrier count reducedCCsUL sub-information element carried in the overheating field in the second UE assistance information is 0. The network side device is further configured to: in response to the second UE assistance information, release the NR link to the electronic device. The electronic device is further configured to: after releasing the NR link, disable NR measurement.

In this way, when the electronic device has established the LTE-NR dual connectivity, if the electronic device detects that the NR link needs to be released, the electronic device may report the second UE assistance information to the network side, to trigger the network side to release the NR link. The uplink component carrier count (reducedCCsUL) sub-information element carried in the overheating field in the second UE assistance information is 0. After the NR link is disconnected and the electronic device is single-connected to the LTE access network device, if the electronic device detects that the LTE-NR dual connectivity needs to be established, the electronic device may report the first UE assistance information to the network side, to trigger the network side to quickly establish the NR link to the electronic device. The uplink component carrier count (reducedCCsUL) sub-information element carried in the overheating field in the first UE assistance information is not 0 or the overheating field does not carry any sub-information element. In this way, the electronic device can be switched from an LTE single connectivity to the LTE-NR dual connectivity in time, without interrupting a data service, so that a risk of paging loss is reduced.

In a possible implementation, the electronic device is further configured to: before performing data exchange with the network side through the LTE link, perform data exchange with the network side device through both the LTE link and the NR link; and when the electronic device meets a second preset condition, actively send second UE assistance information to the network side device. The second UE assistance information includes the maxCC field, and an uplink secondary component carrier count reducedCCsUL sub-information element carried in the maxCC field in the second UE assistance information is 0. The network side device is further configured to: in response to the second UE assistance information, release the NR link to the electronic device.

In this way, when the electronic device has established the LTE-NR dual connectivity, if the electronic device detects that the NR link needs to be released, the electronic device may report the second UE assistance information to the network side, to trigger the network side to release the NR link. The uplink component carrier count (reducedCCsUL) sub-information element carried in the maxCC field in the second UE assistance information is 0. After the NR link is disconnected and the electronic device is single-connected to the LTE access network device, if the electronic device detects that the LTE-NR dual connectivity needs to be established, the electronic device may report the first UE assistance information to the network side, to trigger the network side to quickly establish the NR link to the electronic device. The uplink component carrier count (reducedCCsUL) sub-information element carried in the maxCC field in the first UE assistance information is not 0 or the maxCC field does not carry any sub-information element. In this way, the electronic device can be switched from an LTE single connectivity to the LTE-NR dual connectivity in time, without interrupting a data service, so that a risk of paging loss is reduced.

In a possible implementation, the network side device is further configured to: before receiving the first UE assistance information, send a UE capability query request to the electronic device. The electronic device is further configured to: in response to the UE capability query request, send UE capability information to the network side device. The UE capability information is used to represent that the electronic device supports an overheating mechanism. The network side device is further configured to: after receiving the UE capability information, send network reconfiguration information to the electronic device. The network reconfiguration information includes overheating configuration information. The electronic device is further configured to: in response to the network reconfiguration information, execute configuration content in the overheating configuration information.

In a possible implementation, the electronic device is further configured to: before actively sending the first UE assistance information to the network side device, when detecting that the electronic device has no data service, send radio resource control RRC connection release signaling to the network side device. The network side device is further configured to: in response to the RRC connection release signaling, disconnect an RRC connection from the electronic device. The electronic device is further configured to: when the electronic device meets a second preset condition and detects that the electronic device has a data service, send RRC connection setup signaling to the network side device. The network side device is further configured to: in response to the RRC connection setup signaling, establish the RRC connection to the electronic device. The electronic device is further configured to: disable NR measurement, and send second UE assistance information to the network side device. The reducedCCsUL sub-information element in the second UE assistance information is 0. The network side device is further configured to: in response to the second UE assistance information, perform data exchange with the electronic device through the LTE link.

In this way, when the electronic device has disconnected the RRC connection from the network side, if the electronic device resumes establishing the RRC connection after detecting that the NR link is not needed, the electronic device may disable NR measurement and send the second UE assistance information to the network side, to indicate that the network side no longer triggers establishing the NR link. Then, if the electronic device detects that the LTE-NR dual connectivity needs to be established, the electronic device may report the first UE assistance information to the network side, to trigger the network side to quickly establish the NR link to the electronic device. The uplink component carrier count (reducedCCsUL) sub-information element carried in the overheating field in the first UE assistance information is not 0 or the overheating field does not carry any sub-information element. In this way, when the electronic device detects that the NR link is released, the network side no longer triggers establishing the NR link to the electronic device. When detecting that the LTE-NR dual connectivity is established, the electronic device switches from the LTE single connectivity to the LTE-NR dual connectivity in time, without interrupting a data service, so that a risk of paging loss is reduced.

The first preset condition may include any one of the following: 1. The electronic device turns on a screen. 2. The electronic device turns on a screen, and a data transmission rate between the electronic device and the network side device is greater than a first preset rate. 3. The electronic device turns on a screen, and a size of a data packet that needs to be transmitted by the electronic device is greater than a first preset threshold. 4. A device temperature of the electronic device is greater than or equal to a preset temperature threshold. 5. The electronic device turns off a screen, and a data transmission rate between the electronic device and the network side device is greater than a second preset rate. 6. The electronic device turns off a screen, and a size of a data packet transmitted between the electronic device and the network side device is greater than a second preset threshold.

The second preset condition may include any one of the following: 1. The electronic device turns off a screen. 2. The electronic device turns on a screen, and a data transmission rate between the electronic device and the network side device is less than or equal to a first preset rate. 3. The electronic device turns on a screen, and a size of a data packet that needs to be transmitted by the electronic device is less than or equal to a first preset threshold. 4. A device temperature of the electronic device is greater than or equal to a preset temperature threshold. 5. The electronic device turns off a screen, and a data transmission rate between the electronic device and the network side device is less than or equal to a second preset rate. 6. The electronic device turns off a screen, and a size of a data packet transmitted between the electronic device and the network side device is greater than a second preset threshold.

According to a second aspect, this application provides an electronic device, including one or more processors and a computer storage medium. The computer storage medium includes computer instructions, and when the one or more processors execute the computer instructions, the electronic device is enabled to perform the following actions: performing data exchange with a network side device through a long term evolution LTE link; and when the electronic device meets a first preset condition, actively sending first UE assistance information to the network side device, where the first user equipment UE assistance information includes a first field, an uplink secondary component carrier count reducedCCsUL sub-information element carried in the first field is a first value or the first field does not carry any sub-information element, where the first value is greater than 0; establishing a new radio NR link to the network side device; and performing data exchange with the network side device through both the LTE link and the NR link.

According to the electronic device provided in this application, the electronic may send UE assistance information to the network side device, to trigger the network side to quickly establish an NR link connection to the electronic device or release the NR link connection. Specifically, a field such as an overheating (overheating) protection field or a maximum secondary component carrier (maxCC) in the UE assistance information may be used to indicate the network side to establish the NR link connection or release the NR link connection. In this way, when the electronic device needs to release the NR connection in an LTE-NR dual connectivity, the network side is quickly triggered to release an NR SCG, to reduce power consumption. When the electronic device needs to establish the LTE-NR dual connectivity in a single LTE connectivity, the electronic device may quickly trigger the network side to add an NR SCG, to quickly resume the LTE-NR dual connectivity and improve a data transmission rate.

1. A protocol version of the first UE assistance information may be the 3rd Generation Partnership Project 3GPP technical protocol specification R14 version or R15 version, and the first field is the overheating (overheating) protection field. 2. A protocol version of the first UE assistance information may be the 3GPP technical protocol specification R16 version, and the first field is the maximum secondary component carrier count maxCC field.

In a possible implementation, that the electronic device performs data exchange with the network side device through both the LTE link and the NR link specifically includes: The electronic device sends data to the network side device by using both an uplink primary component carrier on the LTE link and N uplink secondary component carriers activated by the network side device on the NR link, where N is the first value.

In a possible implementation, before performing data exchange with the network side through the LTE link, the electronic device performs data exchange with the network side device through both the LTE link and the NR link. When the electronic device meets a second preset condition, the electronic device actively sends secondary cell group failure (SCG failure) signaling to the network side device. The electronic device releases the NR link to the network side device, and disables NR measurement.

In a possible implementation, before performing data exchange with the network side through the LTE link, the electronic device performs data exchange with the network side device through both the LTE link and the NR link. When the electronic device meets a second preset condition, the electronic device actively sends second UE assistance information to the network side device. The second UE assistance information includes the overheating field, and an uplink secondary component carrier count reducedCCsUL sub-information element carried in the overheating field in the second UE assistance information is 0. The electronic device releases the NR link to the network side device, and disables NR measurement.

In a possible implementation, before performing data exchange with the network side through the LTE link, the electronic device performs data exchange with the network side device through both the LTE link and the NR link. When the electronic device meets a second preset condition, the electronic device actively sends second UE assistance information to the network side device. The second UE assistance information includes the maxCC field, and an uplink secondary component carrier count reducedCCsUL sub-information element carried in the maxCC field in the second UE assistance information is 0. The electronic device releases the NR link to the network side device, and disables NR measurement.

In a possible implementation, before sending the first UE assistance information to the network side device, the electronic device receives a UE capability query request sent by the network side device. In response to the UE capability query request, the electronic device sends UE capability information to the network side device. The UE capability information is used to represent that the electronic device supports an overheating mechanism. The electronic device receives network reconfiguration information sent by the network side device. The network reconfiguration information includes overheating configuration information. In response to the network reconfiguration information, the electronic device executes configuration content in the overheating configuration information.

In a possible implementation, before actively sending the first UE assistance information to the network side device, when detecting that the electronic device has no data service, the electronic device sends radio resource control RRC connection release signaling to the network side device. The RRC connection release signaling is used to indicate the network side device to disconnect an RRC connection from the electronic device. The electronic device disconnects the RRC connection from the network side device. When the electronic device meets a second preset condition and detects that the electronic device has a data service, the electronic device sends RRC connection setup signaling to the network side device. The RRC connection setup signaling is used to indicate the network side device to establish the RRC connection to the electronic device. The electronic device establishes the RRC connection to the network side device. The electronic device disables NR measurement, and sends second UE assistance information to the network side device. A reducedCCsUL sub-information element in the second UE assistance information is 0. The electronic device performs data exchange with the network side device through the LTE link.

The first preset condition may include any one of the following: 1. The electronic device turns on a screen. 2. The electronic device turns on a screen, and a data transmission rate between the electronic device and the network side device is greater than a first preset rate. 3. The electronic device turns on a screen, and a size of a data packet that needs to be transmitted by the electronic device is greater than a first preset threshold. 4. A device temperature of the electronic device is greater than or equal to a preset temperature threshold. 5. The electronic device turns off a screen, and a data transmission rate between the electronic device and the network side device is greater than a second preset rate. 6. The electronic device turns off a screen, and a size of a data packet transmitted between the electronic device and the network side device is greater than a second preset threshold.

The second preset condition may include any one of the following: 1. The electronic device turns off a screen. 2. The electronic device turns on a screen, and a data transmission rate between the electronic device and the network side device is less than or equal to a first preset rate. 3. The electronic device turns on a screen, and a size of a data packet that needs to be transmitted by the electronic device is less than or equal to a first preset threshold. 4. A device temperature of the electronic device is greater than or equal to a preset temperature threshold. 5. The electronic device turns off a screen, and a data transmission rate between the electronic device and the network side device is less than or equal to a second preset rate. 6. The electronic device turns off a screen, and a size of a data packet transmitted between the electronic device and the network side device is greater than a second preset threshold.

According to a third aspect, this application provides a chip system, applied to an electronic device. The chip system includes an application processor AP and a baseband processor BP.

The baseband processor is configured to perform data exchange with a network side device through a long term evolution LTE link.

The application processor is further configured to: when the electronic device meets a first preset condition, send a first instruction to the baseband processor.

The baseband processor is further configured to: in response to the first instruction, actively send first UE assistance information to the network side device. The first user equipment UE assistance information includes a first field, an uplink secondary component carrier count reducedCCsUL sub-information element carried in the first field is a first value or the first field does not carry any sub-information element. The first value is greater than 0.

The baseband processor is further configured to establish a new radio NR link to the network side device.

The baseband processor is further configured to perform data exchange with the network side device through both the LTE link and the NR link.

According to the chip system provided in this application, the baseband processor may send UE assistance information to the network side, to trigger the network side to quickly establish an NR link connection to the baseband processor or release the NR link connection. Specifically, a field such as an overheating (overheating) protection field or a maximum secondary component carrier (maxCC) in the UE assistance information may be used to indicate the network side to establish the NR link connection or release the NR link connection. In this way, when the baseband processor needs to release the NR connection in an LTE-NR dual connectivity, the network side is quickly triggered to release an NR SCG, to reduce power consumption. When the baseband processor needs to establish the LTE-NR dual connectivity in a single LTE connectivity, the baseband processor may quickly trigger the network side to add an NR SCG, to quickly resume the LTE-NR dual connectivity and improve a data transmission rate.

1. A protocol version of the first UE assistance information may be the 3rd Generation Partnership Project 3GPP technical protocol specification R14 version or R15 version, and the first field is an overheating (overheating) protection field. 2. A protocol version of the first UE assistance information may be the 3GPP technical protocol specification R16 version, and the first field is the maximum secondary component carrier count maxCC field.

In a possible implementation, the baseband processor is specifically configured to send data to the network side device by using both an uplink primary component carrier on the LTE link and N uplink secondary component carriers activated by the network side device on the NR link, where N is the first value.

In a possible implementation, the baseband processor is further configured to: before performing data exchange with the network side through the LTE link, perform data exchange with the network side device through both the LTE link and the NR link. The application processor is further configured to: when the electronic device meets a second preset condition, send a second instruction to the baseband processor. The baseband processor is further configured to: in response to the second instruction, actively send secondary cell group failure (SCG failure) signaling to the network side device. The baseband processor is further configured to: release the NR link to the network side device, and disable NR measurement.

In a possible implementation, the baseband processor is further configured to: before performing data exchange with the network side through the LTE link, perform data exchange with the network side device through both the LTE link and the NR link. The application processor is further configured to: when the electronic device meets a second preset condition, send a second instruction to the baseband processor. The baseband processor is further configure to: in response to the second instruction, actively send second UE assistance information to the network side device. The second UE assistance information includes the overheating field, and an uplink secondary component carrier count reducedCCsUL sub-information element carried in the overheating field in the second UE assistance information is 0. The baseband processor releases the NR link to the network side device, and disables NR measurement.

In a possible implementation, the baseband processor is further configured to: before performing data exchange with the network side through the LTE link, perform data exchange with the network side device through both the LTE link and the NR link. The application processor is further configured to: when the electronic device meets a second preset condition, send a second instruction to the baseband processor. The baseband processor is further configure to: in response to the second instruction, actively send second UE assistance information to the network side device. The second UE assistance information includes the maxCC field, and an uplink secondary component carrier count reducedCCsUL sub-information element carried in the maxCC field in the second UE assistance information is 0. The baseband processor releases the NR link to the network side device, and disables NR measurement.

In a possible implementation, the baseband processor is further configured to: before sending the first UE assistance information to the network side device, receive a UE capability query request sent by the network side device. The baseband processor is further configured to: in response to the UE capability query request, send UE capability information to the network side device. The UE capability information is used to represent that the electronic device supports an overheating mechanism. The baseband processor is further configured to: receive network reconfiguration information sent by the network side device. The network reconfiguration information includes overheating configuration information. The baseband processor is further configured to: in response to the network reconfiguration information, execute configuration content in the overheating configuration information.

In a possible implementation, the application processor is further configured to: before sending the first instruction to the baseband processor, when detecting that the electronic device has no data service, send a third instruction to the baseband processor. The baseband processor is further configured to: in response to the third instruction, send radio resource control RRC connection release signaling to the network side device. The RRC connection release signaling is used to indicate the network side device to disconnect an RRC connection from the electronic device. The baseband processor is further configured to disconnect the RRC connection from the network side device. The application processor is further configured to: when the electronic device meets a second preset condition, send a second instruction to the baseband processor. The application processor is further configured to: when detecting that the electronic device has a data service, send a fourth instruction to the baseband processor. The baseband processor is further configured to: in response to the fourth instruction, send RRC connection setup signaling to the network side device. The RRC connection setup signaling is used to indicate the network side device to establish the RRC connection to the electronic device. The baseband processor is further configured to establish the RRC connection to the network side device. The baseband processor is further configured to: in response to the second instruction, disable NR measurement, and send second UE assistance information to the network side device. A reducedCCsUL sub-information element in the second UE assistance information is 0. The baseband processor is further configured to perform data exchange with the network side device through the LTE link.

The first preset condition may include any one of the following: 1. The electronic device turns on a screen. 2. The electronic device turns on a screen, and a data transmission rate between the electronic device and the network side device is greater than a first preset rate. 3. The electronic device turns on a screen, and a size of a data packet that needs to be transmitted by the electronic device is greater than a first preset threshold. 4. A device temperature of the electronic device is greater than or equal to a preset temperature threshold. 5. The electronic device turns off a screen, and a data transmission rate between the electronic device and the network side device is greater than a second preset rate. 6. The electronic device turns off a screen, and a size of a data packet transmitted between the electronic device and the network side device is greater than a second preset threshold.

The second preset condition may include any one of the following: 1. The electronic device turns off a screen. 2. The electronic device turns on a screen, and a data transmission rate between the electronic device and the network side device is less than or equal to a first preset rate. 3. The electronic device turns on a screen, and a size of a data packet that needs to be transmitted by the electronic device is less than or equal to a first preset threshold. 4. A device temperature of the electronic device is greater than or equal to a preset temperature threshold. 5. The electronic device turns off a screen, and a data transmission rate between the electronic device and the network side device is less than or equal to a second preset rate. 6. The electronic device turns off a screen, and a size of a data packet transmitted between the electronic device and the network side device is greater than a second preset threshold.

According to a fourth aspect, this application provides a network connection method. The method includes: An electronic device performs data exchange with a network side device through a long term evolution LTE link. When the electronic device meets a first preset condition, the electronic device actively sends first UE assistance information to the network side device. The first user equipment UE assistance information includes a first field, an uplink secondary component carrier count reducedCCsUL sub-information element carried in the first field is a first value or the first field does not carry any sub-information element. The first value is greater than 0. The electronic device establishes a new radio NR link to the network side device. The electronic device performs data exchange with the network side device through both the LTE link and the NR link.

According to the network connection method provided in this application, the electronic device may send UE assistance information to the network side, to trigger the network side to quickly establish an NR link connection to the electronic device or release the NR link connection. Specifically, a field such as an overheating (overheating) protection field or a maximum secondary component carrier (maxCC) in the UE assistance information may be used to indicate the network side to establish the NR link connection or release the NR link connection. In this way, when the electronic device needs to release the NR connection in an LTE-NR dual connectivity, the network side is quickly triggered to release an NR SCG, to reduce power consumption. When the electronic device needs to establish the LTE-NR dual connectivity in a single LTE connectivity, the electronic device may quickly trigger the network side to add an NR SCG, to quickly resume the LTE-NR dual connectivity and improve a data transmission rate.

1. A protocol version of the first UE assistance information may be the 3rd Generation Partnership Project 3GPP technical protocol specification R14 version or R15 version, and the first field is the overheating (overheating) protection field. 2. A protocol version of the first UE assistance information may be the 3GPP technical protocol specification R16 version, and the first field is the maximum secondary component carrier count maxCC field.

In a possible implementation, that the electronic device performs data exchange with the network side device through both the LTE link and the NR link specifically includes. The electronic device sends data to the network side device by using both an uplink primary component carrier on the LTE link and N uplink secondary component carriers activated by the network side device on the NR link, where N is the first value.

In a possible implementation, before performing data exchange with the network side through the LTE link, the electronic device performs data exchange with the network side device through both the LTE link and the NR link. When the electronic device meets a second preset condition, the electronic device actively sends secondary cell group failure (SCG failure) signaling to the network side device. The electronic device releases the NR link to the network side device, and disables NR measurement.

In a possible implementation, before performing data exchange with the network side through the LTE link, the electronic device performs data exchange with the network side device through both the LTE link and the NR link. When the electronic device meets a second preset condition, the electronic device actively sends second UE assistance information to the network side device. The second UE assistance information includes the overheating field, and an uplink secondary component carrier count reducedCCsUL sub-information element carried in the overheating field in the second UE assistance information is 0. The electronic device releases the NR link to the network side device, and disables NR measurement.

In a possible implementation, before performing data exchange with the network side through the LTE link, the electronic device performs data exchange with the network side device through both the LTE link and the NR link. When the electronic device meets a second preset condition, the electronic device actively sends second UE assistance information to the network side device. The second UE assistance information includes the maxCC field, and an uplink secondary component carrier count reducedCCsUL sub-information element carried in the maxCC field in the second UE assistance information is 0. The electronic device releases the NR link to the network side device, and disables NR measurement.

In a possible implementation, before sending the first UE assistance information to the network side device, the electronic device receives a UE capability query request sent by the network side device. In response to the UE capability query request, the electronic device sends UE capability information to the network side device. The UE capability information is used to represent that the electronic device supports an overheating mechanism. The electronic device receives network reconfiguration information sent by the network side device. The network reconfiguration information includes overheating configuration information. In response to the network reconfiguration information, the electronic device executes configuration content in the overheating configuration information.

In a possible implementation, before actively sending the first UE assistance information to the network side device, when detecting that the electronic device has no data service, the electronic device sends radio resource control RRC connection release signaling to the network side device. The RRC connection release signaling is used to indicate the network side device to disconnect an RRC connection from the electronic device. The electronic device disconnects the RRC connection from the network side device. When the electronic device meets a second preset condition and detects that the electronic device has a data service, the electronic device sends RRC connection setup signaling to the network side device. The RRC connection setup signaling is used to indicate the network side device to establish the RRC connection to the electronic device. The electronic device establishes the RRC connection to the network side device. The electronic device disables NR measurement, and sends second UE assistance information to the network side device. A reducedCCsUL sub-information element in the second UE assistance information is 0. The electronic device performs data exchange with the network side device through the LTE link.

The first preset condition may include any one of the following: 1. The electronic device turns on a screen. 2. The electronic device turns on a screen, and a data transmission rate between the electronic device and the network side device is greater than a first preset rate. 3. The electronic device turns on a screen, and a size of a data packet that needs to be transmitted by the electronic device is greater than a first preset threshold. 4. A device temperature of the electronic device is greater than or equal to a preset temperature threshold. 5. The electronic device turns off a screen, and a data transmission rate between the electronic device and the network side device is greater than a second preset rate. 6. The electronic device turns off a screen, and a size of a data packet transmitted between the electronic device and the network side device is greater than a second preset threshold.

The second preset condition may include any one of the following: 1. The electronic device turns off a screen. 2. The electronic device turns on a screen, and a data transmission rate between the electronic device and the network side device is less than or equal to a first preset rate. 3. The electronic device turns on a screen, and a size of a data packet that needs to be transmitted by the electronic device is less than or equal to a first preset threshold. 4. A device temperature of the electronic device is greater than or equal to a preset temperature threshold. 5. The electronic device turns off a screen, and a data transmission rate between the electronic device and the network side device is less than or equal to a second preset rate. 6. The electronic device turns off a screen, and a size of a data packet transmitted between the electronic device and the network side device is greater than a second preset threshold.

According to a fifth aspect, an embodiment of this application provides a computer storage medium, including computer instructions. When the computer instructions are run on an electronic device, the electronic device is enabled to perform the network connection method according to any possible implementation of the foregoing aspects.

According to a sixth aspect, an embodiment of this application provides a computer program product. When the computer program product runs on a computer, the computer is enabled to perform the network connection method according to any possible implementation of the foregoing aspects.

DESCRIPTION OF EMBODIMENTS

The following clearly describes technical solutions in embodiments of this application in detail with reference to the accompanying drawings. In the descriptions of embodiments of this application, unless otherwise specified, "/" indicates "or". For example, A/B may indicate A or B. The term "and/or" in this specification merely describes an association relationship for describing associated objects, and indicates that three relationships may exist. For example, A and/or B may indicate the following three cases: Only A exists, both A and B exist, and only B exists. In addition, in the descriptions of embodiments of this application, "a plurality of" means two or more.

The following terms "first" and "second" are merely intended for a purpose of description, and shall not be understood as an indication or implication of relative importance or implicit indication of a quantity of indicated technical features. Therefore, a feature limited by "first" or "second" may explicitly or implicitly include one or more features. In the descriptions of embodiments of this application, unless otherwise specified, "a plurality of" means two or more than two.

The following describes an EN-DC network architecture in this application.

Figure 1:
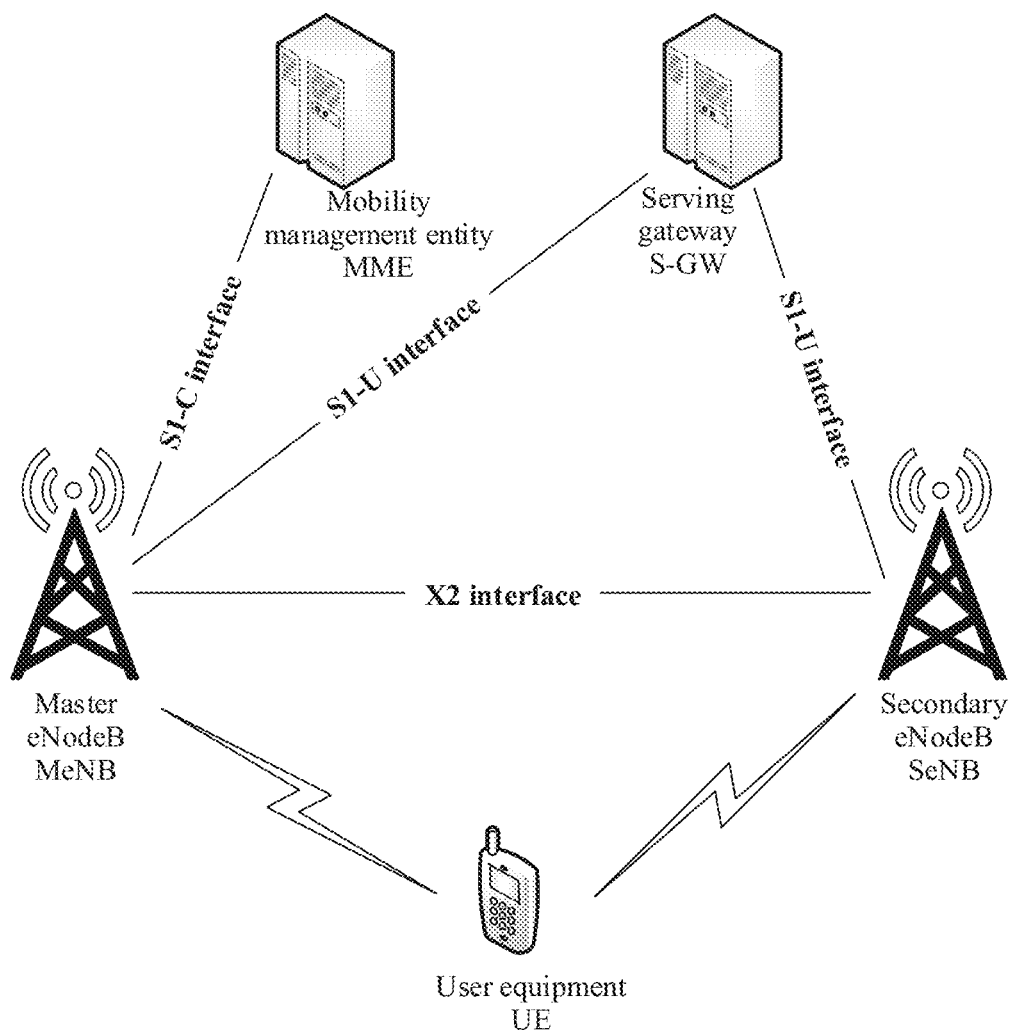
FIG. 1 is a schematic diagram of an EN-DC network architecture according to an embodiment of this application.

FIG. 1 shows the EN-DC network architecture according to this application.

As shown in FIG. 1, the EN-DC network architecture includes a master eNodeB MeNB (a base station in a 4G LTE access network), a secondary eNodeB SeNB (a base station in 5G NR), an electronic device (which may be referred to as UE), and a mobility management entity (mobility management entity, MME), and a serving gateway (serving gateway, S-GW). Quantities of master eNodeBs, secondary eNodeBs, and electronic devices are not limited. Herein, one master eNodeB, one secondary eNodeB, and one electronic device are used as an example, and does not constitute a limitation.

The base station (which may be specifically the MeNB or the SeNB) provides an air interface for a user, and the electronic device UE is connected to the base station in a wireless manner. Further, the base station is connected to a core network of an operator in a wired manner, to implement service communication.

The electronic device UE is a network-supporting device, and may include but is not limited to a mobile phone, a tablet computer (table computer), a personal digital assistant (personal digital assistant, PDA), and a mobile internet device (mobile internet device, MID), a wearable device (wearable device), and another device that supports communication with a network.

The MME is a network element on the core network, and is mainly responsible for providing signaling transmission, user authentication, roaming management, and the like in NSA networking.

The serving gateway (serving gateway, S-GW) is mainly responsible for processing user data of a local network, for example, routing or forwarding packet data.

As shown in FIG. 1, the master eNodeB MeNB is connected to the mobility management entity MME through an S1-C interface, and the master eNodeB MeNB is connected to the serving gateway S-GW through an S1-U interface. The master eNodeB MeNB may be connected to the secondary eNodeB SeNB through an X2 interface, and the secondary eNodeB SeNB may further be connected to the S-GW through an S1-U interface based on an actual service requirement. In a communication process, the master eNodeB MeNB may generate an RRC message after performing communication coordination with the secondary eNodeB SeNB through the X2 interface, and then forwards the RRC message to the UE, to implement functions such as network system information broadcasting, handover, measurement configuration, and measurement report reporting. This is not limited.

The following describes interface protocol layers of an electronic device in this application.

Figure 2:
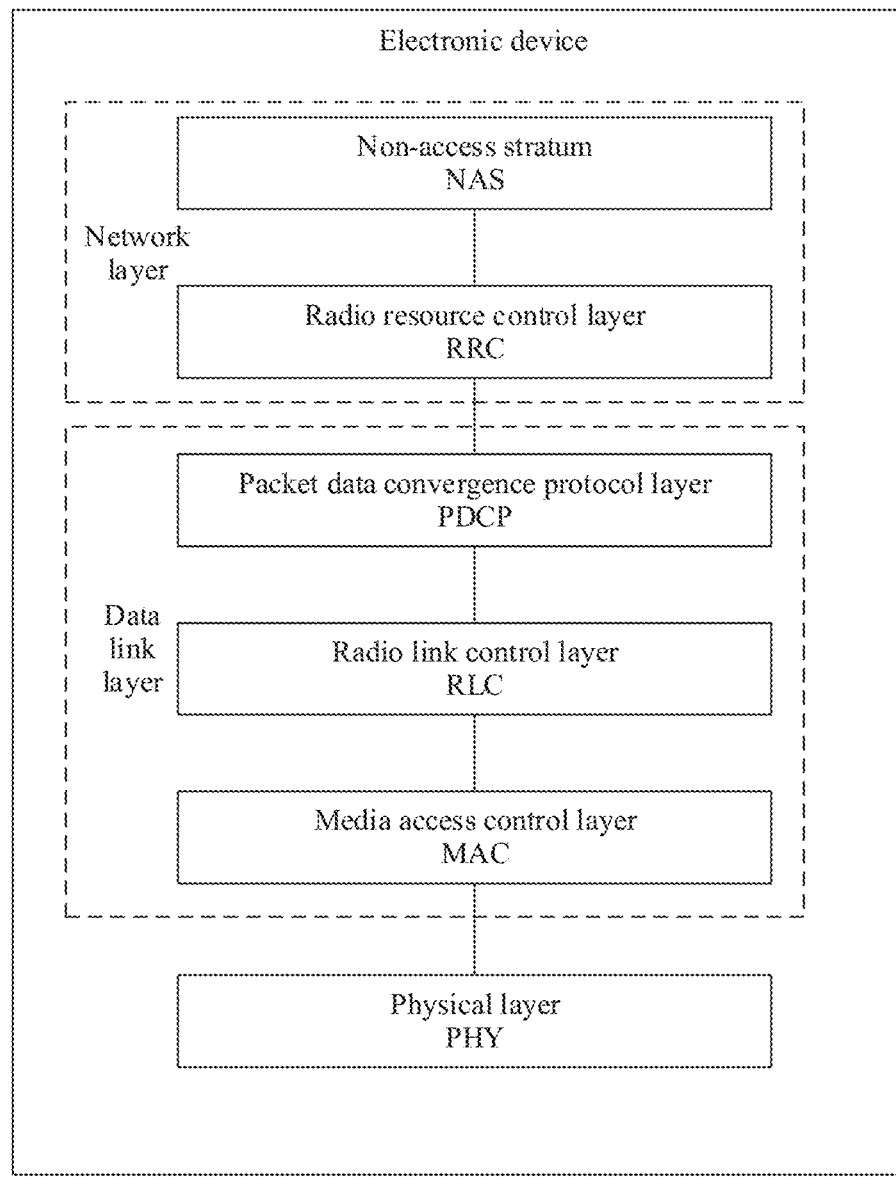
FIG. 2 is a schematic diagram of layered communication of an interface protocol of an electronic device according to an embodiment of this application.

FIG. 2 is a schematic diagram of layered communication of an interface protocol of the electronic device according to an embodiment of this application. During actual application, an interface indicates an information exchange manner between different network elements, and different interface protocols may be used for communication between different interfaces. Currently, an interface protocol of a wireless standard includes three layers: a physical layer (physical layer, PHY), a data link layer, and a network layer.

As shown in FIG. 2, the physical layer PHY is located at a bottom layer, and is mainly responsible for processing modulation and demodulation, antenna mapping, or another telecommunications physical layer function.

The data link layer includes a packet data convergence protocol (packet data convergence protocol, PDCP) layer, a radio link control (radio link control, RLC) layer, and a media access control (media access control, MAC) layer. The PDCP layer is mainly responsible for performing header compression, to reduce bit traffic transmitted through a wireless interface. The RLC layer is mainly responsible for processing such as segmentation and connection and sequence control of high-layer data. The MAC layer is mainly responsible for hybrid automatic repeat request (hybrid automatic repeat request, HARQ) retransmission, uplink and downlink scheduling, and the like. During actual application, an LTE-NR dual connectivity technology may specifically implement a bearer and split of carrier aggregation at an L2 data link layer. Specifically, as described above, the carrier aggregation is carried and split at the medium access control (medium access control, MAC) layer, and a bearer and split of the dual connectivity is implemented at the packet data convergence protocol (packet data convergence protocol, PDCP) layer.

The network layer includes a non-access stratum (non-access stratum, NAS) and an RRC layer. The non-access stratum NAS may be used to transmit user information or control information, for example, information about establishment, release, and mobility management of a 4G/5G communication link or service. A protocol layer below the NAS may also be referred to as an access stratum (access stratum, AS). The RRC layer supports signaling protocols of a plurality of functions between the electronic device UE and the base station eNB, broadcasts system messages at the NAS and the AS, establishes, remains, and releases an RRC connection, establishes, modifies, and releases an end-to-end radio bearer (for example, a radio access network link between the UE and a network side), and supports mobility management including functions such as UE measurement reporting, cell handover, and reselection. During actual application, the UE may communicate with the network side through an L3 network layer, to implement operations such as establishment and release of 4G and 5G access networks. Details are described below in this application.

The following describes a user plane protocol stack architecture in an EN-DC networking technology in this application.

In the EN-DC networking technology, a master cell group (master cell group, MCG) and a secondary cell group (secondary cell group, SCG) are defined, and data bearers are classified into three types based on different data splitting and forwarding manners: an MCG bearer, an SCG bearer, and a split (Split) bearer. The master cell group MCG is a cluster of cells in which at least one master eNodeB MeNB of a 4G LTE access network is located, and the secondary cell group is a cluster of cells in which at least one secondary eNodeB SeNB of 5G NR is located.

Figure 3:
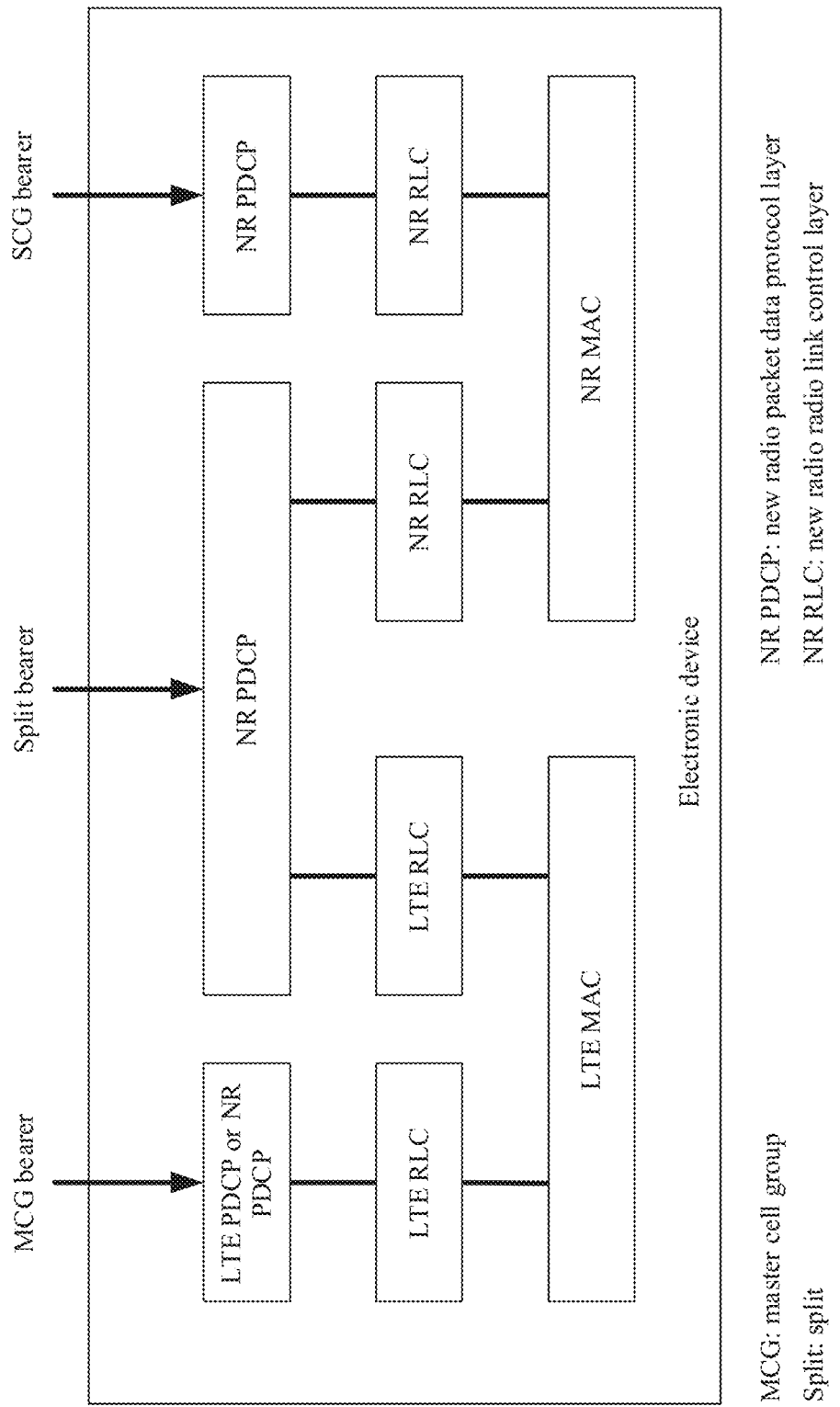
FIG. 3 is a schematic communication diagram of a data bearer link on a UE side according to an embodiment of this application.

FIG. 3 is a schematic diagram of communication of a data bearer link on a UE side according to an embodiment of this application.

As shown in FIG. 3, the UE side may perceive three types of data bearers: an MCG bearer, an SCG bearer, and a split (Split) bearer. The MCG bearer indicates that data is routed from an S-GW of a core network to a master eNodeB MeNB, and the MeNB directly forwards the data to the UE. The SCG bearer indicates that data is routed from the S-GW of the core network to a secondary eNodeB SeNB, and the SeNB directly forwards the data to the UE. The split bearer indicates that data is split on a base station side and may be forwarded by the master eNodeB MeNB or the secondary eNodeB SeNB to the UE. Alternatively, the data may be simultaneously transmitted by the master eNodeB MeNB and the secondary eNodeB SeNB for the UE based on a preset split ratio, to provide a service.

When the UE perceives that the data bearer is the MCG bearer, a communication link (also referred to as an MCG link) used during data communication is LTE PDCP/NR PDCP-LTE RLC-LTE MAC. When the UE perceives that the data bearer is the SCG bearer, a communication link (also referred to as an SCG link) used during data communication is NR PDCP-NR RLC-NR MAC. When the UE perceives that the data bearer is the split bearer, a communication link (also referred to as a split link) used during data communication is NR PDCP-LTE RLC-LTE MAC or NR PDCP-NR RLC-LTE MAC. Because the SCG link uses only a network resource of the 5G NR, the SCG link may also be referred to as an NR link. Because the MCG link uses a network resource of the 4G LTE, and the MCG link may also be referred to as an LTE link.

Figure 4:
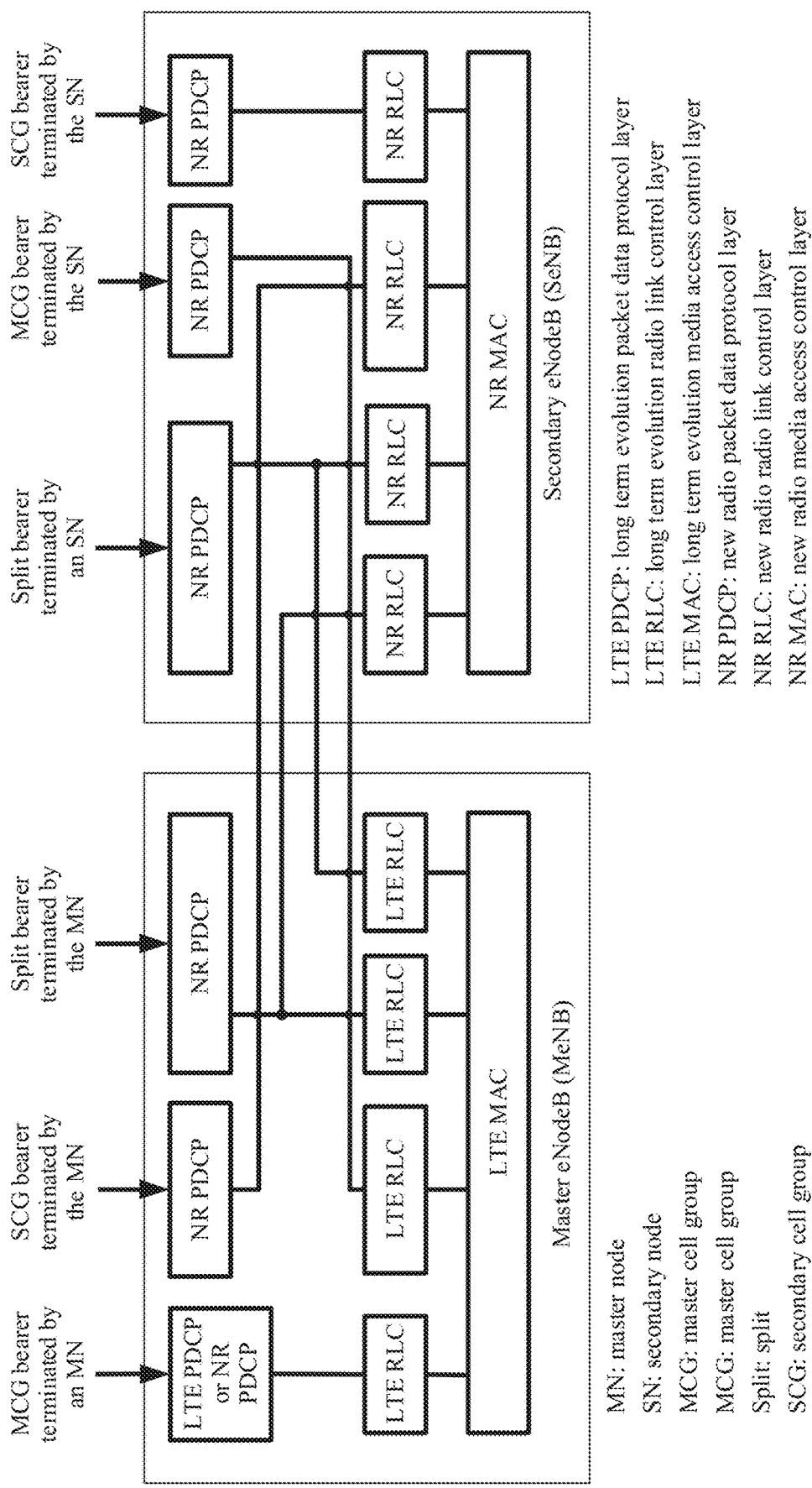
FIG. 4 is a schematic communication diagram of a data bearer link on a network side according to an embodiment of this application.

FIG. 4 is a schematic diagram of communication of a data bearer link on a network side according to an embodiment of this application.

As shown in FIG. 4, there are six manners in which the network side perceives data bearers: an MCG bearer terminated by a master node (master node, MN, which may specifically refer to a master eNodeB MeNB), an SCG bearer terminated by the MN, a split (Split) bearer terminated by the MN, an MCG bearer terminated by a secondary node (secondary node, SN, which may specifically refer to a secondary eNodeB SeNB), an SCG bearer terminated by the SN, and a split (Split) bearer terminated by the SN.

The bearer terminated by the MN is a radio bearer at a PDCP layer on the master eNodeB MeNB, but not a radio bearer on the secondary eNodeB SeNB. Conversely, the bearer terminated by the SN is a radio bearer at the PDCP layer on the secondary eNodeB SeNB, but not a radio bearer on the master eNodeB MeNB. When the data bearer perceived by the network side is the MCG bearer terminated by the MN, a communication link used during data communication is LTE PDCP/NR PDCP-LTE RLC-LTE MAC. When the data bearer perceived by the network side is the split bearer terminated by the MN, a communication link used during data communication is NR PDCP-LTE RLC-LTE MAC or NR PDCP-NR RLC-NR MAC. Specific selection may be made based on an actual requirement, and is not limited. Communication links corresponding to various data bearers perceived by the network side are specifically shown in FIG. 4. Details are not described herein again.

In 5G NSA networking. EN-DC is an important application scenario. The electronic device performs data communication by using the network side of two access networks LTE and NR, and sends and receives service data packets in the two access networks, thereby significantly improving user data experience. In the EN-DC mode, when the electronic device works in an LTE standard and an NR standard at the same time, components related to the two standards need to work at the same time. Compared with single-mode working, working in this mode causes relatively high power consumption of the electronic device and is likely to increase a temperature.

In some scenarios, for example, a screen-off scenario, a low-rate application scenario, a no-data-traffic scenario, or a scenario in which a power saving mode is enabled, the electronic device being in LTE can meet a service requirement, and a power consumption factor needs to be preferentially considered, so that an NR connection is released. In addition, because the temperature of the electronic device is quite high, to protect the electronic device and a user of the electronic device, an NR SCG also needs to be released.

Figure 5:
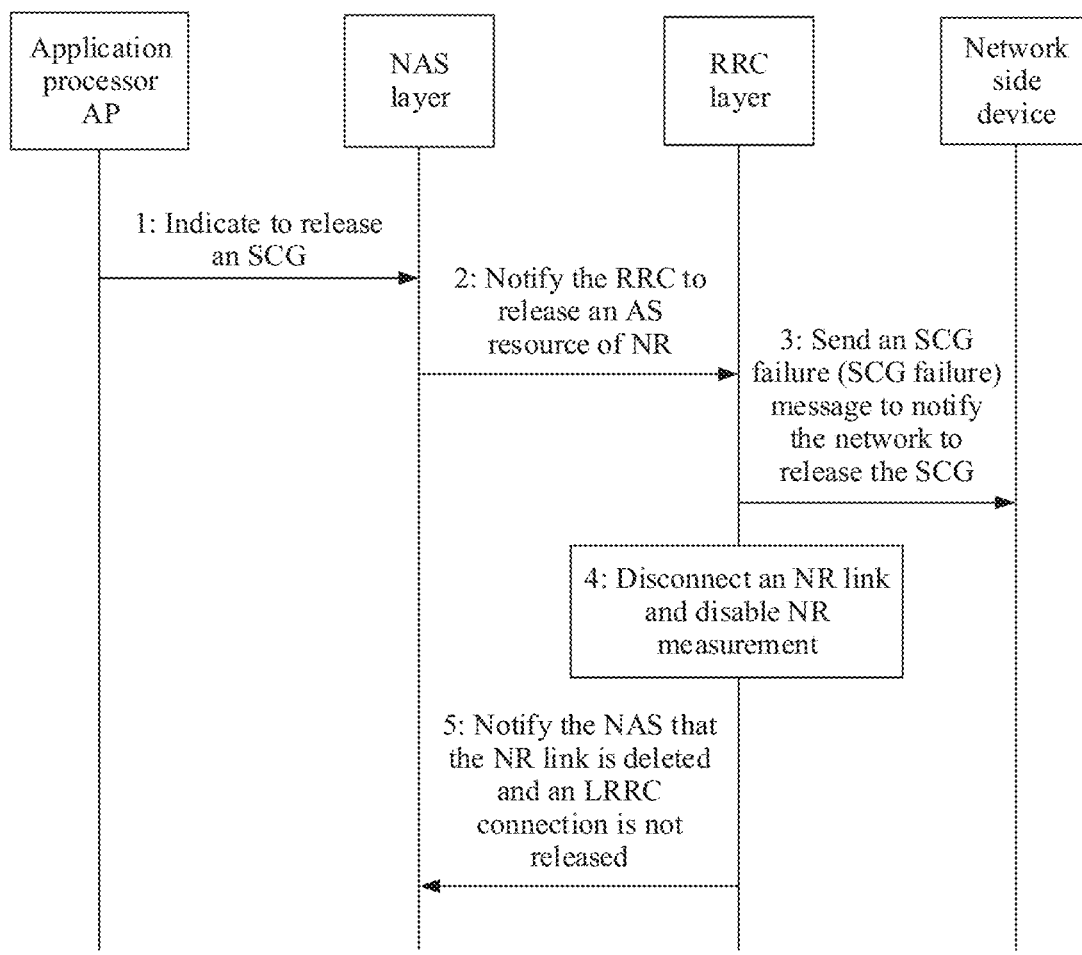
FIG. 5 is a schematic flowchart of triggering a network to release an NR connection according to an embodiment of this application.

FIG. 5 is a schematic flowchart of triggering a network to release an NR connection according to this application.

As shown in FIG. 5, an electronic device UE may include an application processor AP a NAS, and an RRC layer. The RRC layer specifically includes LTE RRC (LRRC for short) and NR RRC (NRRC for short). A process in which the electronic device releases an NR SCG may be as follows:

1. When detecting that the NR SCG needs to be released, the application processor AP of the electronic device may indicate the NAS to release the SCG.
2. The NAS may notify the RRC layer to release an access stratum (access stratum. AS) resource of NR.
3. The RRC layer may send an SCG failure message to the network side device, where the SCG failure message may be used to indicate the network side device to release the SCG
4. After the network side device receives the SCG failure message sent by the RRC layer of the electronic device, the network side device may disconnect an NR link from the RRC layer of the electronic device. The RRC layer may disable NR measurement.
5. After disconnecting the NR link and disabling the NR measurement, the RRC layer of the electronic device may notify the NAS that the NR link is deleted and an LRRC connection is not released.

In the foregoing manner in which the electronic device reports the SCG failure message to the network side device, the network side device may be triggered to release the NR SCG. However, if the electronic device frequently reports the SCG failure message to the network side device, an exception indicator of the network side increases, and the network cannot determine a network exception cause. In addition, in a live network, even if the terminal reports an SCG failure, the network may not release the SCG.

In some scenarios, the electronic device has released the NR SCG. However, when the electronic device needs to use a 5G service, the electronic device needs to resume and establish a 5G connection as soon as possible, to ensure a network speed requirement of an application and user experience.

Figure 6:
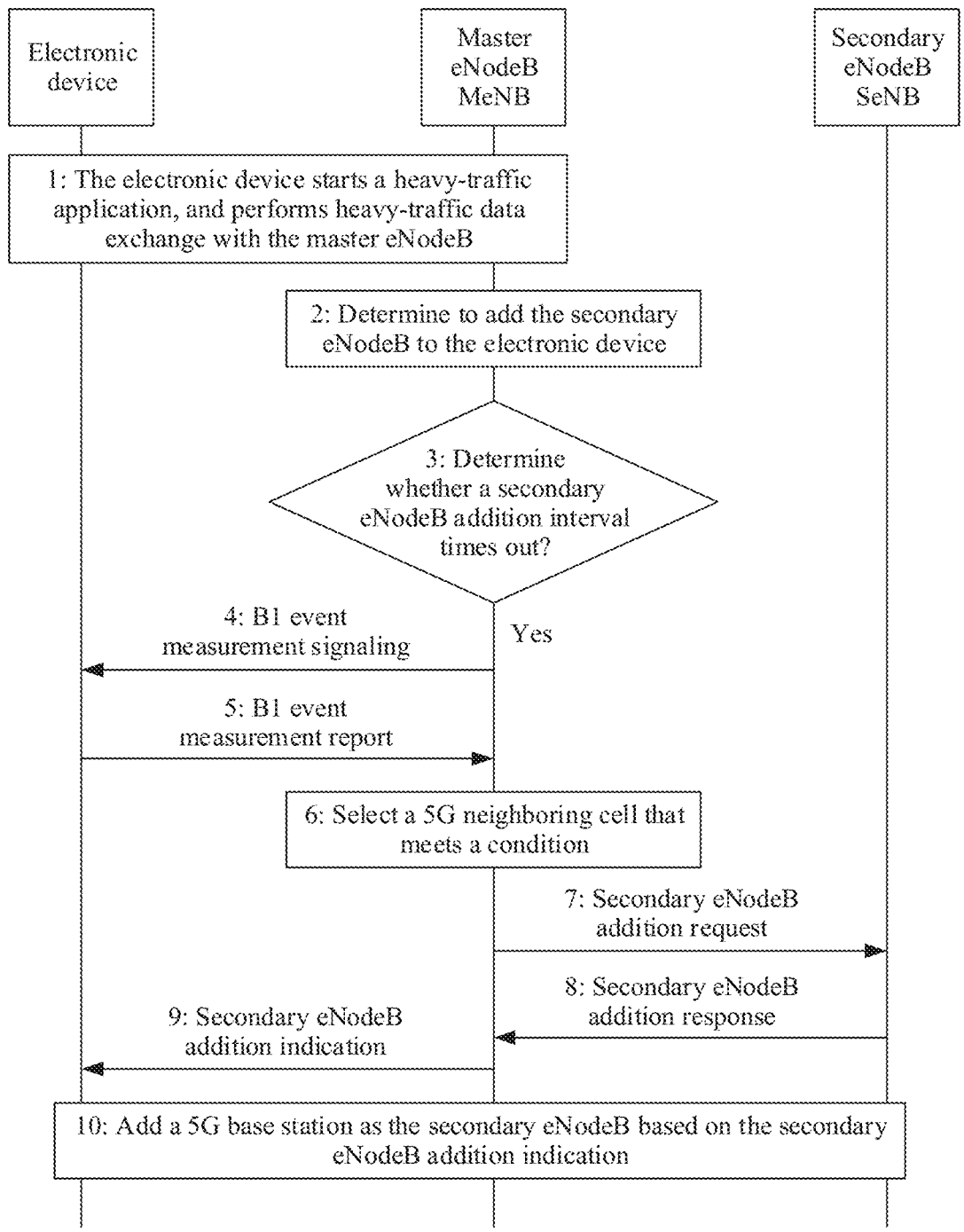
FIG. 6 is a schematic flowchart of triggering a network to establish an NR connection according to an embodiment of this application.

FIG. 6 is a schematic flowchart of triggering a network to establish an NR connection according to this application.

As shown in FIG. 6, a process in which an electronic device establishes the NR connection may be as follows:

1. The electronic device may start a heavy-traffic application, and perform heavy-traffic data exchange with a master eNodeB MeNB.
2. The master eNodeB may determine, based on data traffic information of the electronic device, that a secondary eNodeB SeNB needs to be added for the electronic device.
3. The master eNodeB may determine whether a secondary eNodeB addition interval times out (for example, exceeds 60 s).
4. If the secondary eNodeB addition interval times out (for example, exceeds 60 s), the master eNodeB may send B1 event measurement signaling to the electronic device.
5. After receiving the B1 event measurement signaling, the electronic device may send a B1 event measurement report to the master eNodeB when a signal of an inter-RAT neighboring cell is greater than a specified threshold. The B1 event measurement report includes the inter-RAT neighboring cell whose signal measured by the electronic device is greater than the specified threshold.
6. The master eNodeB may select an appropriate 5G neighboring cell for the electronic device based on the B1 event measurement report.
7. After selecting the appropriate 5G neighboring cell for the electronic device, the master eNodeB may send a secondary eNodeB addition request to the secondary eNodeB.
8. After receiving the secondary eNodeB adding request sent by the master eNodeB, the secondary eNodeB may return a secondary eNodeB addition response to the master eNodeB.
9. The master eNodeB may send a secondary eNodeB addition indication to the electronic device.
10. The electronic device may add a 5G base station as the secondary eNodeB based on the secondary eNodeB addition indication.

When the NR connection is established in the foregoing manner, the electronic device needs to passively wait for the master eNodeB to start an NR SCG addition process. The master eNodeB periodically starts NR SCG addition. Even if the electronic device already meets an NR SCG addition condition, the master eNodeB does not add the NR SCG to the electronic device until a next addition interval times out. For example, if an NR SCG addition interval of the master eNodeB may be 60 s, the electronic device waits for a maximum of 60 s before connecting to a 5G network. In some possible scenarios, for example, because of low traffic, the electronic device triggers the master eNodeB on the network side to release the NR SCG. Then, the electronic device starts a speed test application to start to measure a mobile network speed. However, because the NR SCG addition interval does not time out, the master eNodeB on the network side does not start the NR SCG addition process at this time. As a result, the electronic device measures only an LTE rate. In some other possible scenarios, video software of the electronic device downloads a video from the network by using a segment buffering mechanism. For example, a 1-gigabyte (gigabyte, GB) video is divided into five segments of data chunks for buffering. Each segment of data chunk has data of 200 megabytes (megabytes, MB). After completing buffering of a first data chunk of 200 MB, the electronic device pauses buffering or performs small-traffic buffering, so that the electronic device releases the NR SCG. After the first data chunk of 200 MB is played, the electronic device starts to download a second data chunk of 200 MB. In this case, because the NR SCG addition interval does not time out, the master eNodeB on the network side does not start the NR SCG addition process, and the electronic device can download data only through an LTE network. Consequently, a network speed is not fast enough, and video playing freezes. Therefore, if the NR connection is resumed in the foregoing manner, the electronic device cannot connect to the 5G network in time when the electronic device needs to use the 5G network.

Figure 7:
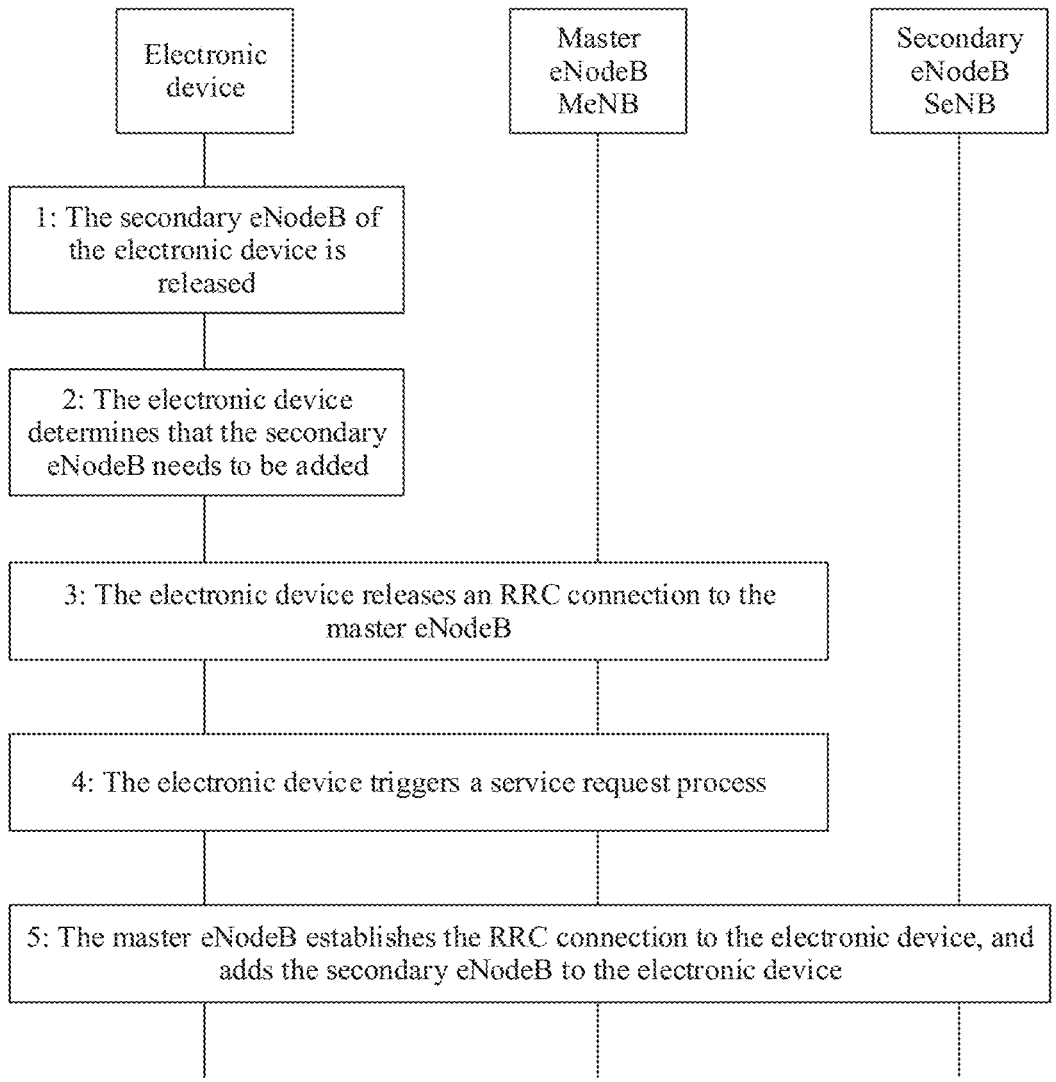
FIG. 7 is another schematic flowchart of triggering a network to establish an NR connection according to an embodiment of this application.

FIG. 7 is another schematic flowchart of triggering a network to establish an NR connection according to this application.

As shown in FIG. 7, a process in which an electronic device establishes the NR connection may be as follows:

1. A secondary eNodeB of the electronic device is released.
2. The electronic device determines that the secondary eNodeB needs to be added.
3. The electronic device releases an RRC connection to a master eNodeB.
4. The electronic device triggers a service request process to the master eNodeB.
5. The master eNodeB establishes the RRC connection to the electronic device, and adds the secondary eNodeB to the electronic device.

In the foregoing manner in which the NR connection is established, the electronic device needs to actively and locally release the RRC connection, and then reestablish the RRC connection to the master eNodeB, to trigger the network to configure and add an NR SCG. After the electronic device locally releases the RRC connection, the electronic device is disconnected from the network within a specific period of time, and an application cannot obtain network data. As a result, freezing that can be perceived by a user is caused, and user experience is affected. In addition, the electronic device may lose paging, and the network may consider that the electronic device is exceptional when the process is frequently triggered. Consequently, another compatibility issue occurs.

Therefore, embodiments of this application provide a network connection method. An electronic device may send UE assistance information to a network side, to trigger the network side to quickly establish an NR link connection to the electronic device or release the NR link connection. Specifically, a field such as an overheating (overheating) protection field or a maximum secondary component carrier (maxCC) field in the UE assistance information may be used to indicate the network side to establish the NR link connection or release the NR link connection. In this way, when the electronic device needs to release the NR connection in an LTE-NR dual connectivity, the network side is quickly triggered to release an NR SCG, to reduce power consumption. When the electronic device needs to establish the LTE-NR dual connectivity in a single LTE connectivity, the electronic device may quickly trigger the network side to add an NR SCG, to quickly resume the LTE-NR dual connectivity and improve a data transmission rate.

In a low network speed application scenario, the electronic device can meet a network speed requirement through only an LTE network. To reduce power consumption, an NR link established to the network side needs to be released. In a high network speed application scenario, when being only single-connected to the LTE network, the electronic device cannot meet the network speed requirement, and the electronic device needs to establish the LTE-NR dual connectivity to the network side. The low network speed application scenario may be an application scenario in which a network usage requirement of the electronic device is relatively low. Specifically, the low network speed application scenario may be an application scenario in which a rate with which the electronic device performs data transmission (a data transmission rate for short) is relatively low or a size of a data packet that needs to be transmitted by the electronic device is relatively small. Conversely, an application scenario in which the network usage requirement of the electronic device is relatively high may be referred to as a high network speed application scenario.

In embodiments of this application, when the electronic device is in the low network speed application scenario, it may be referred to as that the electronic device meets a first preset condition. When the electronic device is in the high network speed application scenario, it may be referred to as that the electronic device meets a second preset condition.

For example, the following several possible low network speed application scenarios are provided.

1. The electronic device is in a screen-off state.

In this application, screen states of the electronic device may be classified into a screen-on state and the screen-off state. During actual application, the screen-on state may specifically include a screen-on-unlocked state and a screen-on-locked state.

The screen state of the electronic device may be specifically identified in a software program or hardware detection manner. The software program detection manner is used as an example. The electronic device may first determine an on/off state of a screen based on a screen display value (isScreenOn) defined in human-computer interaction (isInteractive) code under power management (power manager). For example, when isScreenOn is true, it indicates that the electronic device is in the screen-on state. Conversely, it is determined that the electronic device is in the screen-off state. After it is determined that the electronic device is in the screen-on state, the electronic device may further detect and learn, based on screen locking code (isScreenLocked), whether the electronic device is further locked. If the electronic device is locked, it may be determined that the electronic device is in a screen-locked state. Specifically, the electronic device may be in the screen-on-locked state. Otherwise, it is determined that the electronic device is in the screen-on state. Specifically, the electronic device is in the screen-on-unlocked state.

Alternatively, the electronic device may determine the screen state of the electronic device based on an Android (Android) broadcast message sent by a system of the electronic device. Specifically, when the Android broadcast message is used to indicate that the screen is on, it may be determined that the electronic device is in the screen-on state; when the Android broadcast message is used to indicate that the screen is off, it may be determined that the electronic device is in the screen-off state, when the Android broadcast message used to indicate that the screen is locked, it may be determined that the electronic device is in the screen-locked state; or the like. There may be a plurality of manners for identifying the screen state of the electronic device, which are not listed one by one in the present invention.

When the electronic device is in the screen-off state, the electronic device usually does not send or receive data, or maintains only a necessary data packet that ensures that an application is in a wake-up state, for example, a heartbeat test packet or a listening data packet. Usually, this type of data packet is periodically sent and received, and a size of the data packet is relatively small. In the foregoing case, it may be considered that the electronic device has a relatively low requirement on a network parameter and the like and the network usage requirement, and the electronic device does not have a high requirement on the network speed. In some cases, the electronic device may also support running of a background application, but does not have a high requirement on the network speed. For example, a music application downloads music from a network and plays music in the background. The electronic device being single-connected to the LTE network can meet a requirement of the background application.

2. The electronic device is in the screen-on state, and runs at a low network speed, that is, a data transmission rate of the electronic device is less than or equal to a preset rate.

In this application, the low network speed indicates that the data transmission rate of the electronic device is relatively low, for example, less than or equal to the preset rate. Specifically, the low network speed may specifically indicate that a transmission rate of uplink data of the electronic device is relatively low, for example, less than or equal to a first preset rate; or the low network speed may indicate that a transmission rate of downlink data of the electronic device is relatively low, for example, less than or equal to a second preset rate; or the low network speed may indicate that transmission rates of all data including the uplink data and the downlink data of the electronic device are relatively low, for example, less than or equal to a third preset rate; or the like. For ease of description, the transmission rate of the uplink data, the transmission rate of the downlink data, and the transmission rates of all data including the uplink data and the downlink data in this application are collectively referred to as a transmission rate of data, which is referred to as the data transmission rate for short. The data transmission rate indicates a quantity of bits supported by the electronic device to transmit data per unit time, for example, 50 bits per second (bit/s).

The preset rate may be customized by the system, for example, customized based on a user preference or an actual requirement, or may be a value obtained by collecting statistics on a large amount of experimental data. The first preset rate, the second preset rate, and the third preset rate in this application are all customized by the system, and these may be the same or may not be the same. This is not limited.

During actual application, there are a plurality of scenarios in which the electronic device runs at the low network speed. The following shows three example scenarios.

In a first scenario, the electronic device may enable a function run by a low network speed application or disable a function run by a high network speed application. Specifically, to meet a network usage requirement of the low network speed, the electronic device may perform, in a power saving mode, the following application function setting: allowing the low network speed application to run or forbidding the high network speed application to run, that is, enabling the function run by the low network speed application or disabling the function run by the high network speed application. It may be understood that, after the function run by the high network speed application in the electronic device is disabled, only the low network speed application is allowed to run in the electronic device. Because data transmission rates allowed in these low network speed applications are relatively small, the electronic device may determine that the electronic device runs at the low network speed. Optionally, when a plurality of low network speed applications are simultaneously run in the electronic device, a sum of data transmission rates of the applications is still relatively small, for example, less than the preset rate, and the network usage requirement of the low network speed can still be met. In this case, it is still determined that the electronic device runs at the low network speed.

The low network speed application refers to an application that is installed in the electronic device and that has a relatively low requirement on a data transmission rate. For example, a transmission rate of to-be-transmitted data in the application needs to be less than a fourth preset rate. The low network speed application may be specifically customized by the system, or may be manually customized by the user, for example, an application such as a camera application, a phone application, a short SMS message application, or a memo application.

Correspondingly, the high network speed application is an application that is installed in the electronic device and that has a relatively high requirement on a data transmission rate. For example, the data transmission rate needs to be greater than or equal to a fifth preset rate. The high network speed application may also be customized by the system, or customized by the user according to personal preference, for example, a music application and a video application.

Optionally, to exclude a case in which the electronic device is temporarily running at the low network speed or there is a misjudgment, a duration determining condition is added to the electronic device. Specifically, the electronic device may obtain duration in which the data transmission rate of the electronic device is less than or equal to the preset rate. When the duration is greater than or equal to a specific threshold (for example, 1 minute), it may be determined that the electronic device runs at the low network speed. Otherwise, it is still determined that the electronic device does not run at the low network speed. That is, a condition for identifying that the electronic device is in the low network speed application scenario may specifically be: The electronic device is in the screen-on state, and the data transmission rate of the electronic device in a period of time is less than or equal to the preset rate.

In a second scenario, the electronic device exchanges a heartbeat packet with another device, to maintain a normal communication connection. Specifically, when the electronic device does not perform service communication with the another device (for example, a base station), that is, the electronic device does not need to transmit service data, to maintain the communication connection between the electronic device and the another device, the electronic device may usually periodically send the heartbeat packet to the another device, to indicate the electronic device to maintain the communication connection to the another device. During actual application, a data transmission rate of the heartbeat packet is usually relatively low, for example, several kb/s. A size of the heartbeat packet is also relatively small, for example, several kb. Usually, when the heartbeat packet carry no service data, the heartbeat packet may be an empty packet, that is, the heartbeat packet carries only a header but carries no service data.

In a third scenario, the electronic device is in a scenario in which the electronic device runs at the low network speed, for example, a game scenario or a navigation scenario. For example, in the game scenario, the electronic device runs a game application. During actual application, the game application has a relatively high requirement only on a running rate of an application processor (AP) of the electronic device, and has a relatively low requirement on the data transmission rate (namely, a network rate) of the electronic device. Therefore, when the electronic device is in the game scenario, it may be determined that the electronic device runs at the low network speed.

3. The electronic device is in the screen-on state, and a size of a data packet that needs to be transmitted by the electronic device is less than or equal to a first preset threshold.

In the screen-on state, to meet the low network speed application scenario, in addition to the data transmission rate, the electronic device may further consider an amount of data (namely, the size of the data packet that needs to be transmitted) that needs to be transmitted by the electronic device. The size of the data packet that needs to be transmitted by the electronic device may specifically be sizes of all data packets that need to be transmitted (namely, an amount of data that needs to be transmitted) by the electronic device in an application, or a size of a data packet that needs to be transmitted by the electronic device in a unit time.

Specifically, when the electronic device is in the screen-on state, if the size of the data packet that needs to be transmitted by the electronic device is relatively large, for example, greater than the first preset threshold, the electronic device may consider that current communication load of the electronic device is relatively large, that is, the data packet or the amount of the data that needs to be transmitted is relatively large, and the network usage requirement is relatively high. Correspondingly, the electronic device may consider that the electronic device is in the high network speed application scenario. Conversely, if the size of the data packet that needs to be transmitted by the electronic device is relatively small, the electronic device may consider that the communication load of the electronic device is relatively small, that is, the data packet or the amount of the data that needs to be transmitted is relatively small, and the network usage requirement is not high. Correspondingly, the electronic device may consider that the electronic device is in the low network speed application scenario.

4. A device temperature of the electronic device is greater than or equal to a preset temperature threshold.

Regardless of whether the electronic device is in the screen-on state or the screen-off state, when the device temperature of the electronic device is excessively high, for example, when the device temperature is greater than or equal to the preset temperature threshold, a system crash or network disconnection is likely to be caused, and the electronic device may be burned when the situation is more serious. Specifically, components such as the application processor and a baseband processor of the electronic device may be burned. To reduce the temperature of the entire device and protect the device, the electronic device needs to automatically disable a running application, for example, first close an application with high power consumption and a high network speed requirement, such as a video application, and then close an application with low power consumption and a low network speed requirement, such as a weather application or calendar application. Therefore, when the electronic device detects that the temperature of the entire device is excessively high, it may be considered that the electronic device LRRC currently closes an application that requires a relatively high network speed, that is, closes a high network speed application in the electronic device. In this case, the electronic device is in the low network speed application scenario.

A manner in which the device temperature of the electronic device is detected is not limited. For example, when a temperature sensor is installed in the electronic device, the device temperature of the electronic device or a temperature of a component (for example, the application processor or the baseband processor) of the electronic device may be detected and viewed by using the temperature sensor.

During actual application, the device temperature of the electronic device is a sum of temperatures of all components in the entire electronic device during respective running. Because there is a specific error in obtaining the temperature of each component, there is a relatively large error in obtaining the device temperature of the electronic device, and accuracy or precision of obtaining the device temperature of the electronic device is relatively low. Therefore, during actual application, the device temperature of the electronic device may be replaced by temperatures of some core components in the electronic device, for example, a temperature of the application processor (AP), a temperature of a system on chip (system on chip, SOC), or a temperature of a battery.

For example, the application processor (AP) is the most important hardware of entire performance of the electronic device, and performance of the application processor directly affects the performance of the entire electronic device. Therefore, the temperature of the application processor is used as an important embodiment temperature of the device temperature. For example, the device temperature is the temperature of the application processor, and the electronic device may access a basic input output system (basic input output system, BIOS) of the electronic device to obtain the temperature of the application processor. Alternatively, the electronic device may run temperature obtaining software (for example, a Python script file) of the application processor, to obtain the temperature of the application processor. It is convenient to subsequently identify, based on the temperature of the application processor, whether an application scenario of the electronic device is the high network speed application scenario or the low network speed application scenario. Details are not described herein again.

5. The electronic device is in the screen-off state, and runs at the low network speed, that is, the data transmission rate of the electronic device is less than or equal to the second preset rate.

In the screen-off state, there are a plurality of scenarios in which the electronic device runs at the low network speed. There may be two such scenarios.

In a first scenario, in the screen-off state, the electronic device supports running of a background application, for example, music playing. To meet the network usage requirement of the low network speed, the electronic device may perform the following application function setting: allowing the low network speed application to run or forbidding the high network speed application to run, that is, enabling the function run by the low network speed application or disabling the function run by the high network speed application. It may be understood that, after the function run by the high network speed application in the electronic device is disabled, only the low network speed application is allowed to run in the electronic device. Because data transmission rates allowed in these low network speed applications are relatively small, the electronic device may determine that the electronic device runs at the low network speed, that is, the electronic device is in the low network speed application scenario. Optionally, when a plurality of low network speed applications are simultaneously run in the electronic device, a sum of data transmission rates of the applications is still relatively small, for example, less than the second preset rate, and the network usage requirement of the low network speed can still be met. In this case, it is still determined that the electronic device runs at the low network speed.

In a second scenario, when the electronic device is in the screen-off state, the electronic device usually does not send or receive data, or maintains only a necessary data packet that ensures that an application is in a wake-up state, for example, a heartbeat test packet or a listening data packet. Usually, this type of data packet is periodically sent and received, and a size of the data packet is relatively small. In the foregoing case, it may be considered that the electronic device has a relatively low requirement on a network parameter and the like and the network usage requirement, that is, the electronic device is in the low network speed application scenario.

Optionally, after the electronic device turns off the screen, the data transmission rate of the electronic device usually becomes relatively slow. For example, the data transmission rate is less than the preset rate. Therefore, without considering accuracy of identifying the low network speed application scenario, when the electronic device detects that the electronic device is in the screen-off state, it may be directly considered that the electronic device is in the low network speed application scenario.

6. The electronic device is in the screen-off state, and a size of a data packet that needs to be transmitted by the electronic device is less than or equal to a second preset threshold.

In the screen-off state, the electronic device also sends and receives data. For example, the electronic device downloads data when the screen is off, or transmits a heartbeat packet when the screen is off. To meet the network usage requirement of the low network speed, in addition to considering the data transmission rate, the electronic device may further perform identification from a dimension of an amount of data that needs to be transmitted (namely, the size of the data packet that needs to be transmitted) by the UE.

Specifically, when the electronic device is in the screen-off state, to meet a low-usage network requirement in the low network speed application scenario, the size of the data packet that needs to be transmitted by the electronic device may be detected to determine whether the electronic device is in the low network speed application scenario. Specifically, when the size of the data packet that needs to be transmitted by the electronic device is less than the second preset threshold, the electronic device may consider that the communication load of the electronic device is relatively large and the network usage requirement is relatively high, and determine that the electronic device is not in the low network speed application scenario. Conversely, it is considered that communication load of the electronic device is relatively small and the network usage requirement is relatively low, and it is determined that the electronic device is in the low network speed application scenario.

For example, the low network speed application scenario is an application scenario in which the heartbeat packet is exchanged. When the electronic device does not need to perform service communication, to maintain a communication connection between the electronic device and the network side, a heartbeat packet mechanism is usually used to maintain the connection between the electronic device and the network side. Specifically, the electronic device may periodically send the heartbeat packet to the network side, to notify that the electronic device currently has the communication connection to the network side, to maintain a persistent connection between the electronic device and the network side. Correspondingly, after receiving the heartbeat packet, the network side may accordingly return a response packet to the electronic device, to notify that the network side learns that the electronic device and the network side have the communication connection. During actual application, a size of the heartbeat packet is quite small, usually several kb, or may be an empty packet (namely, a data packet that carries no service data and carries only a header), or the like. In this scenario, the electronic device is definitely in the low network speed application scenario.

7. The electronic device disables a 5G network communication function.

In response to receiving an input operation of the user, the electronic device may disable the 5G network communication function. In this scenario, the electronic device determines, based on a requirement of the user, that a 5G network does not need to be used. In this scenario, the electronic device is in the low network speed application scenario.

Figure 8:
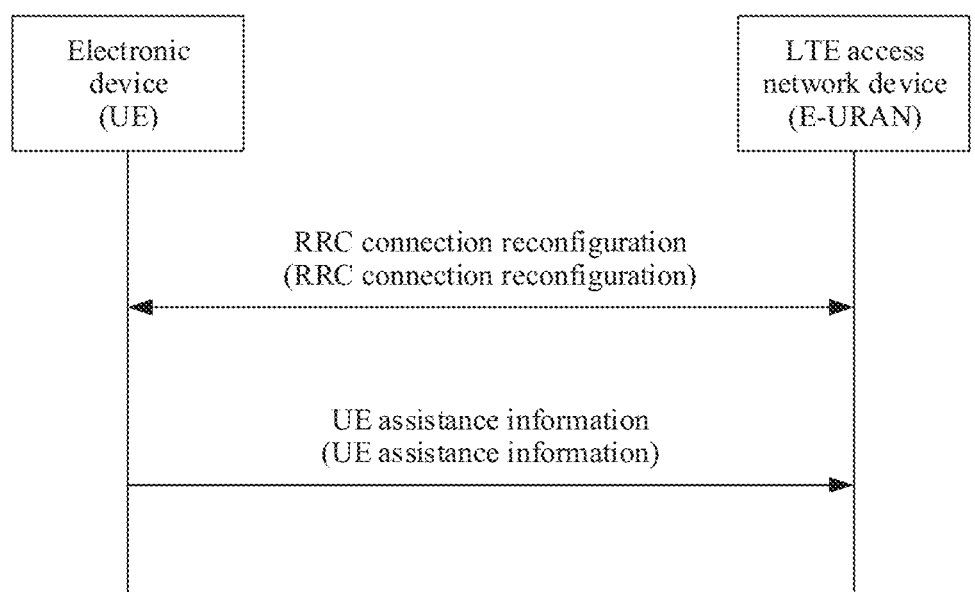
FIG. 8 is a schematic flowchart of network configuration of an overheating field in UE assistance information and reporting of the UE assistance information according to an embodiment of this application.

FIG. 8 shows network configuration of an overheating (overheating) protection field in UE assistance information and a reporting process of the UE assistance information of an electronic device.

As shown in FIG. 8, when an electronic device on a UE side performs RRC connection reconfiguration (RRC connection reconfiguration) with an LTE access network (E-UTRAN) device, the LTE access network (E-UTRAN) device may send network reconfiguration information to the electronic device. The network reconfiguration information includes overheating protection configuration (overheating setup) information.

The overheating setup information may be as follows:

```
"Overheating Assistance Config-r14 CHOICE{
    release                         NULL,
    setup               SEQUENCE{
    Overheating Indication Prohibit Timer-r14 ENUMERATED{s0,
s0dot5, s1, s2, s5, s10, s20, s30, s60, s90, s120, s300, s600, spare3,
spare2, spare1}
    }
} OPTIONAL--Need ON"
```

A candidate value of a time interval at which the electronic device performs overheating reporting and indicated in the overheating setup information may be 0 seconds, 0.5 seconds, 1 second, 2 seconds, 5 seconds, 10 seconds. 20 seconds, 30 seconds. 60 seconds, 90 seconds. 120 seconds, 300 seconds, 60 seconds or another alternative value (spare3, spare2, or spare1). It is optional that the UE assistance information reported by the electronic device carries the overheating field, and the electronic device may add the overheating field to the reported UE assistance information when necessary.

It should be noted that the overheating setup information may be based on the 3GPP R14 protocol version, but is not limited to the 3GPP R14 protocol version, or may be based on a protocol of another version (for example, the 3GPP R15 protocol version or the 3GPP R16 protocol version).

After network configuration is completed, after the electronic device on the UE side completes overheating setup with the LTE access network device, the electronic device may report UE assistance information (UE Assistance Information) that carries the overheating field. Information element content of the overheating field in the UE assistance information may be as follows:

```
"Overheating Assistance-r14::=    SEQUENCE{
    reducedUE-Category              SEQUENCE{
    reducedUE-Category DL       INTEGER{0..19},
    reducedUE-CategoryUL        INTEGER{0..21},
    } OPTIONAL
```

```
    reducedMAXCCs        SEQUENCE{
    reducedCCsDL    INTEGER{0..31},
    reducedCCsUL    INTEGER{0..31},
    } OPTIONAL
}"
```

The overheating field of the foregoing UE assistance information may include a transmission rate level (reduced UE-Category) information element and a maximum secondary component carrier count (reducedMaxCCs) information element. The transmission rate level information element may include a downlink transmission rate level (reducedUE-CategoryDL) sub-information element and an uplink transmission rate level (reducedUE-CategoryUL) sub-information element. A value of the downlink transmission rate level (reducedUE-CategoryDL) sub-information element may be an integer from 0 to 19. A value of the uplink transmission rate level (reducedUE-CategoryUL) sub-information element may be an integer from 0 to 21. The maximum secondary component carrier count (reducedMaxCCs) information element may include a downlink secondary component carrier count (reducedCCsDL) sub-information element and an uplink secondary component carrier count (reducedCCsUL) sub-information element. A value of the downlink secondary component carrier count (reducedCCsDL) sub-information element may be an integer from 0 to 31. A value of the uplink secondary component carrier count (reducedCCsUL) sub-information element may be an integer from 0 to 31.

When the value of the uplink secondary component carrier count (reducedCCsUL) sub-information element in the overheating field in the UE assistance information reported by the electronic device to the network side device is a, a is greater than or equal to 0. The network side device may activate the a uplink secondary component carrier for the electronic device based on a. The electronic device may send data and send an uplink reference signal on a physical uplink shared channel (physical uplink shared channel, PUSCH) on the a activated uplink secondary component carrier. The electronic device may send neither data nor an uplink reference signal on a physical uplink shared channel (physical uplink shared channel, PUSCH) on another inactivated uplink secondary component carrier.

It should be noted that the overheating field may be based on the 3rd Generation Partnership Project (the 3rd generation partnership project, 3GPP) R14 or R15 protocol version, but is not limited to the 3GPP R14 or R15 protocol version, or may be based on a protocol of another version. In some protocol versions, the overheating field may include only the maximum secondary component carrier count (reducedMaxCCs) information element. The maximum secondary component carrier count (reducedMaxCCs) information element may include a downlink secondary component carrier count (reducedCCsDL) sub-information element and an uplink secondary component carrier count (reducedCCsUL) sub-information element. In some protocol versions, the overheating field may further include another information element.

The following describes a network connection method provided in an embodiment of this application.

In some network connection scenarios, an electronic device has been disconnected from an NR link and is single-connected to an LTE access network. If the electronic device detects that an LTE-NR dual connectivity needs to be established, the electronic device may report first UE assistance information to a network side, to trigger the network side to quickly establish the NR link to the electronic device. An uplink component carrier count (reducedCCsUL) sub-information element carried in an overheating field in the first UE assistance information is not 0 or the overheating field does not carry any sub-information element. In this way, the electronic device can be switched from an LTE single connectivity to the LTE-NR dual connectivity in time, without interrupting a data service and a risk of paging loss.

Figure 9:
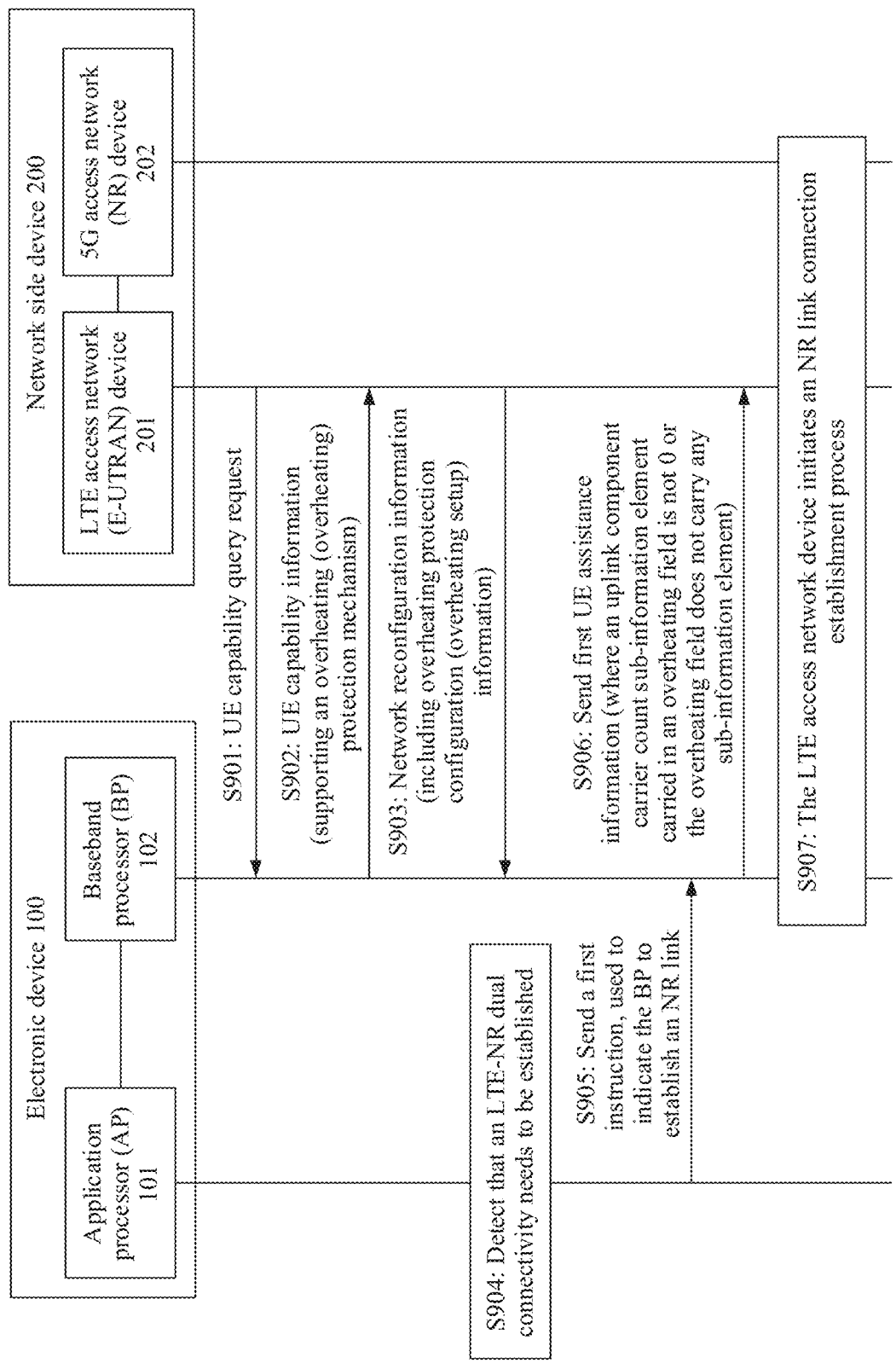
FIG. 9 is a schematic diagram of a network connection method according to an embodiment of this application.

FIG. 9 is a schematic diagram of the network connection method according to this embodiment of this application. As shown in FIG. 9, an electronic device (UE) 100 may include an application processor (AP) 101 and a baseband processor (baseband processor, BP) 102. The baseband processor 102 may include a modem (modem). A network side device 200 includes an LTE access network (E-UTRAN) device 201 and a 5G access network (NR) device 202. The LTE access network device 201 may be the MeNB in the foregoing embodiment, and the 5G access network (NR) device 202 may be the SeNB in the foregoing embodiment.

As shown in FIG. 9, the network connection method may include:

S901: The LTE access network device 201 sends a UE capability query request to the baseband processor 102 of the electronic device 100.

S902: In response to the UE capability query request, the baseband processor 102 sends UE capability information to the LTE access network device 201. The UE capability information may be used to indicate that the electronic device 100 supports an overheating (overheating) protection mechanism.

S903: After receiving the UE capability information sent by the baseband processor 102, the LTE access network device 201 may send network reconfiguration information to the baseband processor 102. The network reconfiguration information includes overheating protection configuration (overheating setup) information.

Specifically, after receiving the UE capability information sent by the baseband processor 102, the LTE access network device 201 may determine that the electronic device 100 supports the overheating protection mechanism. Therefore, the LTE access network device 201 may send the network reconfiguration information (for example, RRC connection reconfiguration (RRC connection reconfiguration) information) on a signaling bearer SRB1 through a downlink dedicated control channel (downlink dedicated control channel, DL_DCCH) to the baseband processor 102 of the electronic device 1M. After receiving the network reconfiguration information, the baseband processor 102 may obtain the overheating setup information from the network reconfiguration information, and complete overheating protection configuration. After completing content in the network reconfiguration information, the baseband processor 102 may return configuration completion information (for example, RRC connection reconfiguration completion (RRC connection reconfiguration completion) information) on the signaling bearer SRB1 through an uplink dedicated control channel (uplink dedicated control channel, UL_DCCH) to the LTE access network device 201.

In a possible implementation, when the electronic device 100 cannot complete overheating setup in the network reconfiguration information, the electronic device 100 may initiate an RRC connection reestablishment process to reestablish the RRC connection to the LTE access network device 201, complete the foregoing overheating protection configuration.

S904: After completing the overheating protection configuration, the application processor 101 may detect that the electronic device 100 needs to establish the LTE-NR dual connectivity.

For a case in which the electronic device 100 needs to establish the LTE-NR dual connectivity, refer to the description of the high network speed scenario in the foregoing embodiment. Details are not described herein again.

S905: When detecting that the electronic device 100 needs to establish the NR link, the application processor 101 may send a first instruction to the baseband processor 102. The first instruction may be used to indicate the baseband processor 102 to establish the NR link to the network side device.

Specifically, the first instruction may be a private command message, for example, an attention (attention, AT) command message. Alternatively, the first instruction may be a conventional command message, for example, an at^syscfgex command message used to establish the NR link, or an at^errccap command message used to resume the NR link.

S906: In response to the first instruction, the baseband processor 102 may send the first UE assistance information to the LTE access network device 201. The first UE assistance information includes the overheating field. The uplink component carrier count sub-information element carried in the overheating field is not 0 or the overheating field does not carry any sub-information element.

In a possible implementation, the overheating field in the first UE assistance information may include a transmission rate level (reducedUE-Category) information element and a maximum secondary component carrier count (reducedMaxCCs) information element. The transmission rate level information element may include a downlink transmission rate level (reducedUE-CategoryDL) sub-information element and an uplink transmission rate level (reducedUE-CategoryUL) sub-information element. The maximum secondary component carrier count (reducedMaxCCs) information element may include a downlink secondary component carrier count (reducedCCsDL) sub-information element and an uplink secondary component carrier count (reducedCCsUL) sub-information element. After receiving the first instruction, the baseband processor 102 may set the uplink component carrier count (reducedCCsUL) sub-information element in the overheating field in the first UE assistance information to a first value. The first value is not 0. For example, the baseband processor 102 may support two uplink secondary component carriers. After receiving the first instruction, the baseband processor 102 may set the uplink secondary component carrier count (reducedCCsUL) sub-information element in the overheating field in the first UE assistance information to 2, and send the first UE assistance information to the LTE access network device 201.

In a possible implementation, after receiving the first instruction, the baseband processor 102 may delete the sub-information element in the overheating field in the first UE assistance information (that is, the overheating field does not carry any sub-information element), and send the first UE assistance information to the LTE access network device 201.

S907: After receiving the first UE assistance information, the LTE access network device 201 may initiate an NR connection establishment process with the electronic device 100.

In a possible implementation, after receiving the first UE assistance information, the LTE access network device 201 may learn, by parsing the first UE assistance information, that the uplink secondary component carrier count (reducedCCsUL) sub-information element carried in the overheating field is not 0. In this case, the LTE access network device 201 may initiate the NR connection establishment process between the 5G access network device and the electronic device 100.

In a possible implementation, after receiving the first UE assistance information, the LTE access network device 201 may learn, by parsing the first UE assistance information, that the overheating field does not carry any sub-information element. In this case, the LTE access network device 201 may initiate the NR link establishment process between the 5G access network device and the electronic device 100.

Specifically, when the LTE access network device 201 learns, by parsing the first UE assistance information, that the uplink secondary component carrier count (reducedCCsUL) sub-information element carried in the overheating field is not 0 or the overheating field does not carry any sub-information element, the LTE access network device 201 may send measurement signaling (for example, B1 event measurement signaling) to the electronic device 100. In response to the measurement signaling, the baseband processor 102 of the electronic device 100 may measure a plurality of 5G cells, and report, to the LTE access network device 201, a measurement report (measurement report) (for example, a B1 event measurement report) of a 5G cell that meets a condition. For example, the condition may be that signal strength of a cell measured by the electronic device 100 meets a specified threshold and the like, and the LTE access network device 201 may send, to the 5G access network device 202, the measurement report of the 5G cell that meets the condition. The 5G access network device 202 may configure a 5G cell for the electronic device 100 based on the measurement report, and send 5G cell configuration information to the electronic device 100 through the LTE access network device 201. For example, the 5G cell configuration information may be the RRC connection reconfiguration (RRC connection reconfiguration) information. The RRC connection reconfiguration information is used to configure a 5G cell accessed by the electronic device 100, or may be denoted as an NR SCG configuration (SCG configuration). The electronic device 100 may access, based on the 5G cell configuration information, the 5G cell configured for the electronic device 100 by the 5G access network device 202, to complete establishment of the NR link.

The following describes a network connection method provided in another embodiment of this application.

In some network connection scenarios, when an electronic device has established an LTE-NR dual connectivity, if the electronic device detects that an NR link needs to be released, the electronic device may report SCG failure signaling to a network side, to trigger the network side to release the NR link. After the NR link has been disconnected and the electronic device is single-connected to an LTE access network device, if the electronic device detects that the LTE-NR dual connectivity needs to be established, the electronic device may report first UE assistance information to the network side, to trigger the network side to quickly establish the NR link to the electronic device. An uplink component carrier count (reducedCCsUL) sub-information element carried in an overheating field in the first UE assistance information is not 0 or the overheating field does not carry any sub-information element. In this way, the electronic device can be switched from an LTE single connectivity to the LTE-NR dual connectivity in time, without interrupting a data service, so that a risk of paging loss is reduced.

Figure 10A:
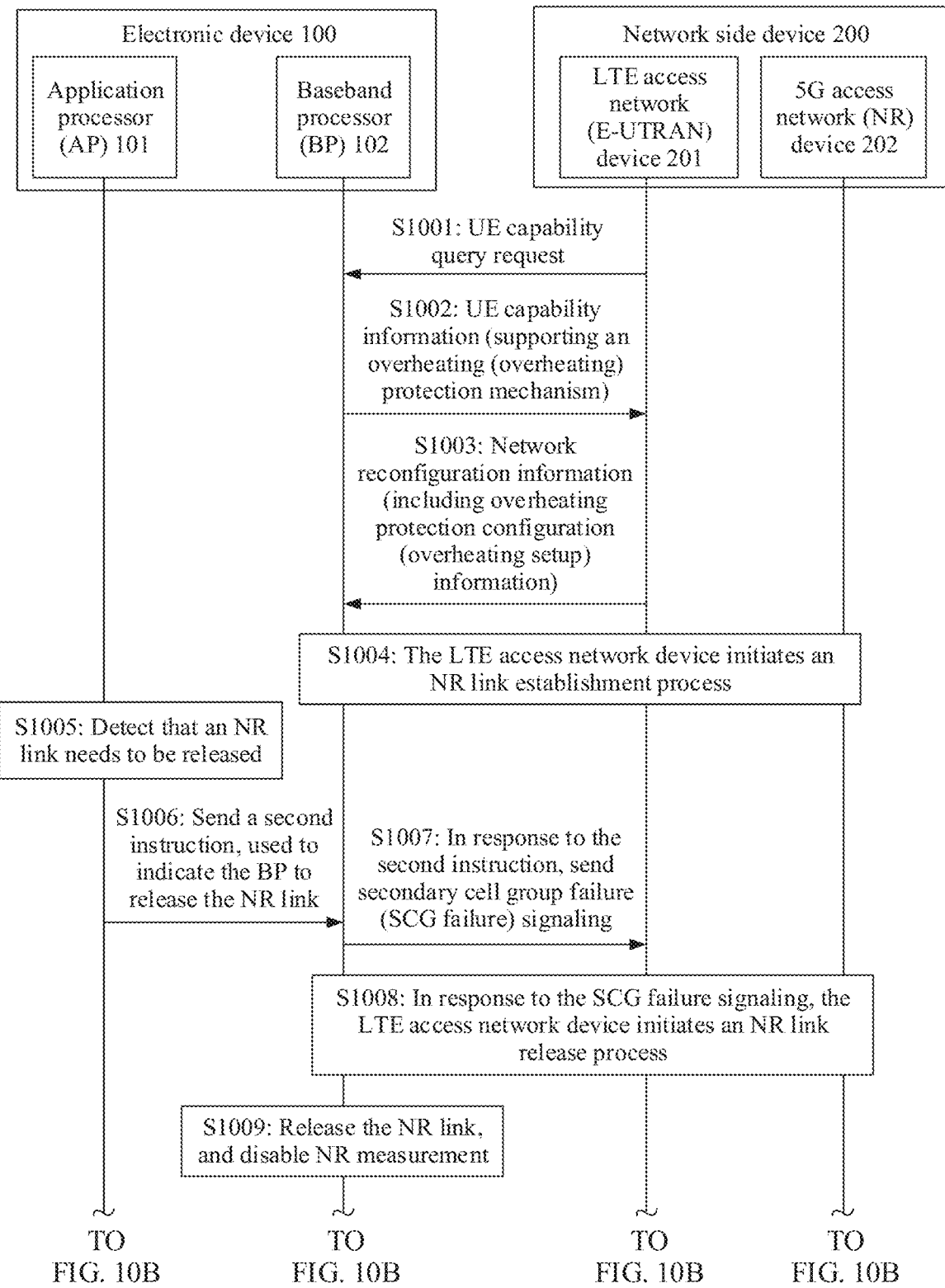
FIG. 10A and FIG. 10B are a schematic diagram of a network connection method according to another embodiment of this application.
Figure 10B:
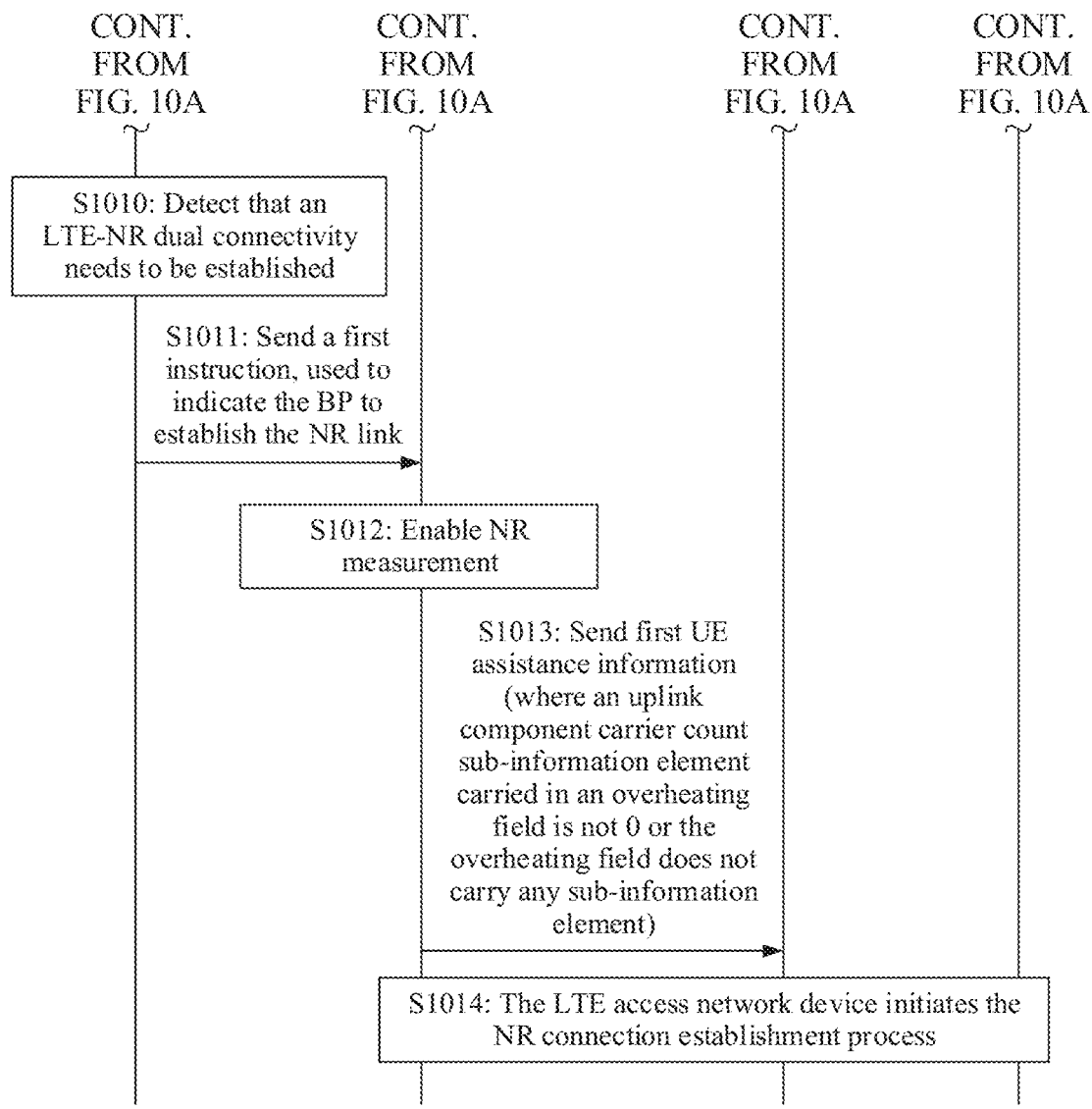

FIG. 10A and FIG. 10B are a schematic diagram of the network connection method according to the another embodiment of this application. As shown in FIG. 10, an electronic device (UE) 100 may include an application processor (AP) 101 and a baseband processor (baseband processor, BP) 102. The baseband processor 102 may include a modem (modem). A network side device 200 includes an LTE access network (E-UTRAN) device 201 and a 5G access network (NR) device 202. The LTE access network device 201 may be the MeNB in the foregoing embodiment, and the 5G access network (NR) device 202 may be the SeNB in the foregoing embodiment.

As shown in FIG. 10A and FIG. 10B, the network connection method may include:

S1001: The LTE access network device 201 sends a UE capability query request to the baseband processor 102 of the electronic device 100.

S1002: In response to the UE capability query request, the baseband processor 102 sends UE capability information to the LTE access network device 201. The UE capability information may be used to indicate that the electronic device 100 supports an overheating (overheating) protection mechanism.

S1003: After receiving the UE capability information sent by the baseband processor 102, the LTE access network device 201 may send network reconfiguration information to the baseband processor 102. The network reconfiguration information includes overheating protection configuration (overheating setup) information.

For specific content, refer to step S903 in the foregoing embodiment shown in FIG. 9. Details are not described herein again.

S1004: The LTE access network device 201 initiates an NR link establishment process.

The LTE access network device 201 may actively initiate the NR link establishment process. For example, when the LTE access network device 201 determines that an NR SCG addition interval exceeds a specified time, the LTE access network device 201 may send measurement signaling (for example, B1 event measurement signaling) to the electronic device 100. In response to the measurement signaling, the baseband processor 102 of the electronic device 100 may measure a plurality of 5G cells, and report, to the LTE access network device 201, a measurement report (measurement report) (for example, a B1 event measurement report) of a 5G cell that meets a condition. For example, the condition may be that signal strength of a cell measured by the electronic device 100 meets a specified threshold and the like, and the LTE access network device 201 may send, to the 5G access network device 202, the measurement report of the 5G cell that meets the condition. The 5G access network device 202 may configure a 5G cell for the electronic device 100 based on the measurement report, and send 5G cell configuration information to the electronic device 100 through the LTE access network device 201. For example, the 5G cell configuration information may be RRC connection reconfiguration (RRC connection reconfiguration) information. The RRC connection reconfiguration information is used to configure a 5G cell accessed by the electronic device 100, or may be denoted as an NR SCG configuration (SCG configuration). The electronic device 100 may access, based on the 5G cell configuration information, the 5G cell configured for the electronic device 100 by the 5G access network device 202, to complete establishment of the NR link.

S1005. The application processor 101 of the electronic device 100 detects that the electronic device 100 needs to release the NR link.

For a case in which the electronic device 100 needs to release the NR link, refer to the description of the low network speed scenario in the foregoing embodiment. Details are not described herein again.

S1006: When detecting that the NR link needs to be released, the application processor 101 may send a second instruction to the baseband processor 102. The second instruction may be used to indicate the baseband processor 102 to release the NR link.

Specifically, the second instruction may be a private command message, for example, an attention (attention, AT) command message. Alternatively, the second instruction may be a conventional command message, for example, an at^syscfgex command message used to remove an NR capability, or an at^errccap command message used to release the NR link.

S1007: In response to the second instruction, the baseband processor 102 may send secondary cell group failure (SCG failure) signaling to the LTE access network device 201, to trigger the LTE access network device 201 to release the NR link.

The SCG failure signaling is specifically used to release a radio resource occupied by an NR connection on the network side, for example, a radio resource related to each function layer (such as an NR PDCP layer, an NR RLC layer, an NR MAC layer, and an NR PHY) included in an SCG link used for NR connection communication. Take releasing a radio resource related to the NR PHY as an example. Specifically, information such as a downlink received channel, a frequency, and a cell identifier ID may be released.

The SCG failure signaling may be specified differently in different protocol versions. For example, in the R12 protocol version, the SCG failure signaling may be an SCGFailureInformation-r12-IEs signaling message, and the SCGFailureInformation-r12-IEs signaling message includes a parameter such as a failure type failureType-r12. The failure type includes any one of the following parameters or a combination of a plurality of parameters: a timer latency (that is, a latency of data transmission supported by the UE and the network side), a random access problem randomAccessProblem, a maximum number of RLC retransmissions rlc-MaxNumRetx (a maximum number of allowing RLC retransmitting a data packet), an SCG link change failure scg-ChangeFailure (that is, SCG link switching is not supported), and the like.

S1008: In response to the SCG failure signaling, the LTE access network device 201 initiates an NR link release process.

Specifically, in response to the received SCG failure signaling, the LTE access network device 201 may indicate the 5G access network device 202 to release a radio resource occupied when the electronic device 100 accesses the 5G access network device 202, for example, the radio resource related to each function layer (such as the NR PDCP layer, the NR RLC layer, the NR MAC layer, and the NR PHY) included in the SCG link used for NR connection communication. Take releasing the radio resource related to the NR PHY as an example. Specifically, the information such as the downlink received channel, the frequency, and the cell identifier ID may be released.

S1009: The baseband processor 102 releases the NR link, and disables NR measurement.

Specifically, after the 5G access network device 202 releases the radio resource occupied by the electronic device 100, the LTE access network device 201 may notify the baseband processor 102 of the electronic device 100 to release a radio resource occupied on a UE side during NR link configuration, for example, release the radio resource related to the transmission function layer such as the NR PDCP layer, the NR RLC layer, the NR MAC layer, and the NR PHY. Specifically, a related configuration parameter involved in configuring the NR connection on the network side, for example, a parameter such as a frequency or a cell identifier, may be released.

After the baseband processor 202 releases the NR link, the baseband processor 202 may not perform NR measurement. Correspondingly, the network side cannot receive the NR measurement report sent by the UE side.

In a possible implementation, after the baseband processor 202 releases the NR link, the baseband processor 202 performs NR measurement, but does not report the NR measurement report to the LTE access device 202.

S1010: The application processor 101 detects that the electronic device 100 needs to establish the LTE-NR dual connectivity.

For a case in which the electronic device 100 needs to establish the LTE-NR dual connectivity, refer to the description of the high network speed scenario in the foregoing embodiment. Details are not described herein again.

S1011: When detecting that the LTE-NR dual connectivity needs to be established, the application processor 101 may send a first instruction to the baseband processor 102. The first instruction may be used to indicate the baseband processor 102 to establish the NR link to the network side device.

Specifically, the first instruction may be a private command message, for example, an attention (attention, AT) command message. Alternatively, the first instruction may be a conventional command message, for example, an atˆsyscfgex command message used to establish the NR link, or an atˆerrccap command message used to resume the NR link.

S1012: In response to the first instruction, the baseband processor 102 may enable NR measurement.

Specifically, in response to the first instruction, the baseband processor 102 may measure a plurality of 5G cells in which the electronic device 100 is located.

S1013: The baseband processor 102 may send the first UE assistance information to the LTE access network device 201. The first UE assistance information includes the overheating field. The uplink component carrier count (reducedCCsUL) sub-information element carried in the overheating field is not 0 or the overheating field does not carry any sub-information element.

For specific content, refer to step S906 in the foregoing embodiment shown in FIG. 9. Details are not described herein again.

S1014: After receiving the first UE assistance information, the LTE access network device 201 may initiate the NR connection establishment process with the electronic device 100.

For specific content, refer to step S907 in the foregoing embodiment shown in FIG. 9. Details are not described herein again.

In some network connection scenarios, when an electronic device has established an LTE-NR dual connectivity, if the electronic device detects that an NR link needs to be released, the electronic device may report second UE assistance information to a network side, to trigger the network side to release the NR link. An uplink component carrier count (reducedCCsUL) sub-information element carried in an overheating field in the second UE assistance information is 0. After the NR link has been disconnected and the electronic device is single-connected to an LTE access network device, if the electronic device detects that the LTE-NR dual connectivity needs to be established, the electronic device may report first UE assistance information to the network side, to trigger the network side to quickly establish the NR link to the electronic device. An uplink component carrier count (reducedCCsUL) sub-information element carried in an overheating field in the first UE assistance information is not 0 or the overheating field does not carry any sub-information element. In this way, the electronic device can be switched from an LTE single connectivity to the LTE-NR dual connectivity in time, without interrupting a data service, so that a risk of paging loss is reduced.

Figure 11A:
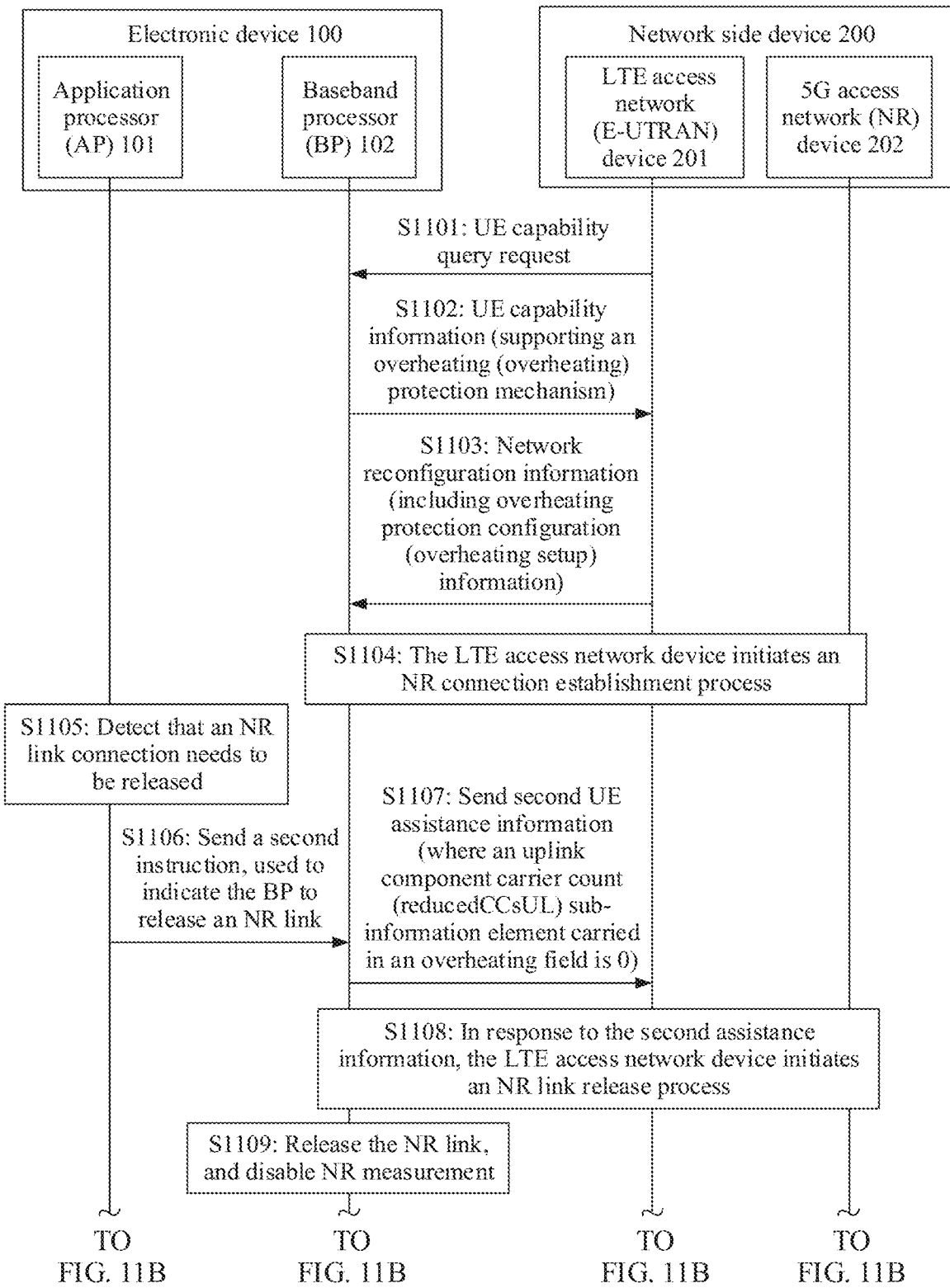
FIG. 11A and FIG. 11B are a schematic diagram of a network connection method according to another embodiment of this application.
Figure 11B:
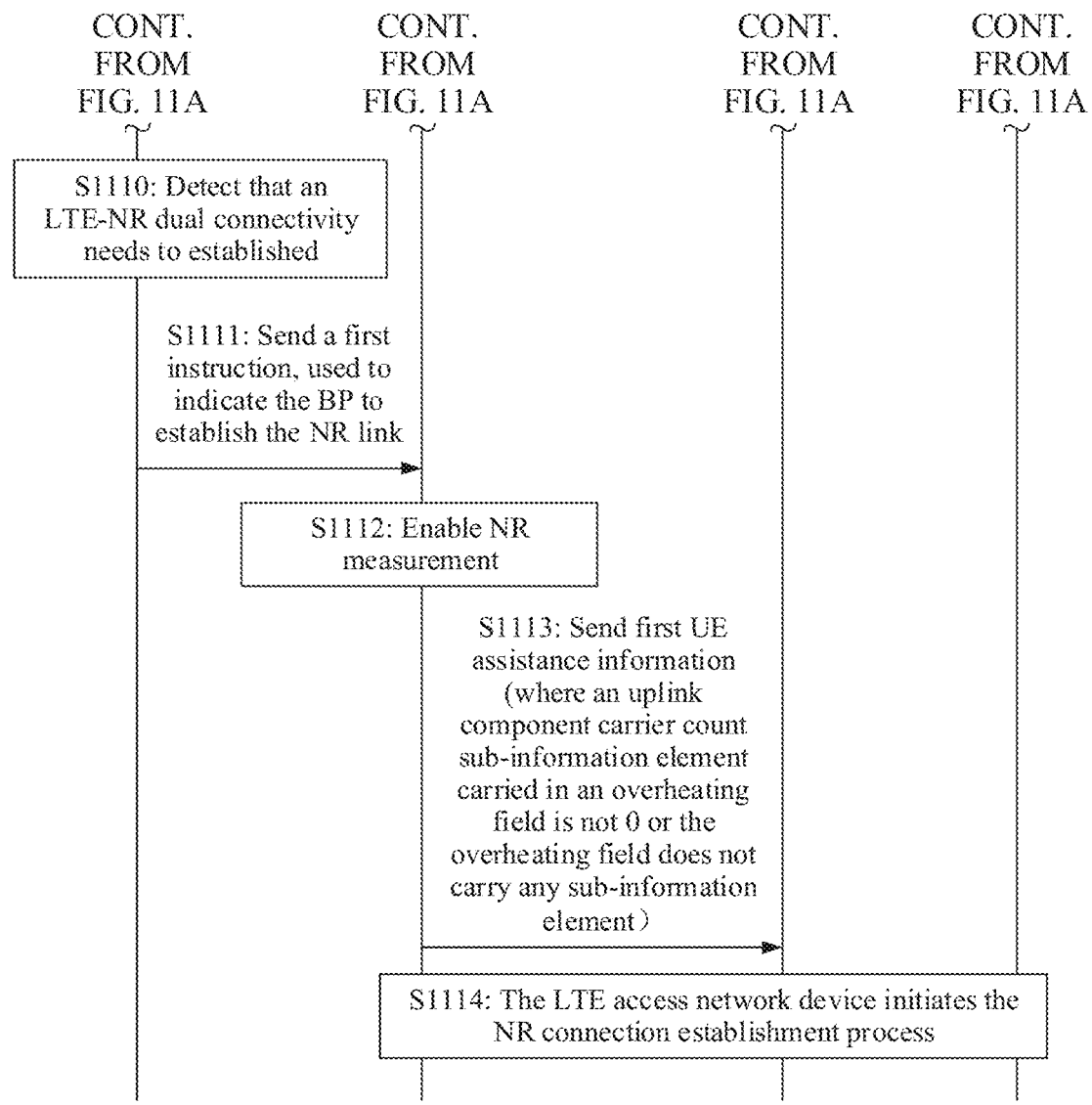

FIG. 11A and FIG. 11B are a schematic diagram of a network connection method according to another embodiment of this application. As shown in 11, an electronic device (UE) 100 may include an application processor (AP) 101 and a baseband processor (baseband processor, BP) 102. The baseband processor 102 may include a modem (modem). A network side device 200 includes an LTE access network (E-UTRAN) device 201 and a 5G access network (NR) device 202. The LTE access network device 201 may be the MeNB in the foregoing embodiment, and the 5G access network (NR) device 202 may be the SeNB in the foregoing embodiment.

As shown in 11, an electronic device (UE) 100 may include an application processor (AP) 101 and a baseband processor (baseband processor, BP) 102. The baseband processor 102 may include a modem (modem). A network side device 200 includes an LTE access network (E-UTRAN) device 201 and a 5G access network (NR) device 202. The LTE access network device 201 may be the MeNB in the foregoing embodiment, and the 5G access network (NR) device 202 may be the SeNB in the foregoing embodiment.

As shown in FIG. 11A and FIG. 11B, the network connection method may include:

S1101: The LTE access network device 201 sends a UE capability query request to the baseband processor 102 of the electronic device 100.

S1102: In response to the UE capability query request, the baseband processor 102 sends UE capability information to the LTE access network device 201. The UE capability information may be used to indicate that the electronic device 100 supports an overheating (overheating) protection mechanism.

S1103: After receiving the UE capability information sent by the baseband processor 102, the LTE access network device 201 may send network reconfiguration information to the baseband processor 102. The network reconfiguration information includes overheating protection configuration (overheating setup) information.

For specific content, refer to step S903 in the foregoing embodiment shown in FIG. 9. Details are not described herein again.

S1104: The LTE access network device 201 initiates an NR link establishment process.

For specific content, refer to step S1004 in the foregoing embodiment shown in FIG. 10A and FIG. 10B. Details are not described herein again.

S1105: The application processor 101 of the electronic device 100 detects that the NR link needs to be released.

For a case in which the electronic device 100 needs to release the NR link, refer to the description of the low network speed scenario in the foregoing embodiment. Details are not described herein again.

S1106: When detecting that the NR link needs to be released, the application processor 101 may send a second instruction to the baseband processor 102. The second instruction may be used to indicate the baseband processor 102 to release the NR link.

Specifically, the second instruction may be a private command message, for example, an attention (attention, AT) command message. Alternatively, the second instruction may be a conventional command message, for example, an at^syscfgex command message used to remove an NR capability, or an at^errccap command message used to release the NR link.

S1107: In response to the second instruction, the baseband processor 102 may send the second UE assistance information to the LTE access network device 201. The uplink secondary component carrier count (reducedCCsUL) sub-information element carried in the overheating field in the second UE assistance information is 0.

The overheating field of the second UE assistance information may include a transmission rate level (reducedUE-Category) information element and a maximum secondary component carrier count (reducedMaxCCs) information element. The transmission rate level information element may include a downlink transmission rate level (reducedUE-CategoryDL) sub-information element and an uplink transmission rate level (reducedUE-CategoryUL) sub-information element. The maximum secondary component carrier count (reducedMaxCCs) information element may include a downlink secondary component carrier count (reducedCCsDL) sub-information element and an uplink secondary component carrier count (reducedCCsUL) sub-information element. After receiving the second instruction, the baseband processor 102 may set the uplink secondary component carrier count (reducedCCsUL) sub-information element in the overheating field in the first UE assistance information to 0. For example, even if the baseband processor 102 may support two uplink secondary component carriers, after receiving the second instruction, the baseband processor 102 may also set the uplink secondary component carrier count (reducedCCsUL) sub-information element in the overheating field in the second UE assistance information to 0, and send the second UE assistance information to the LTE access network device 201.

S1108: In response to the second UE assistance information, the LTE access network device 201 initiates an NR link release process.

Specifically, after receiving the second UE assistance information sent by the electronic device 100, the LTE access network device 201 may learn, by parsing the second UE assistance information, that the uplink component carrier count (reducedCCsUL) sub-information element in the overheating field is 0. In response to the received second assistance information, the LTE access network device 201 may send NR release signaling to the 5G access network device 202. The NR release signaling may be used to indicate the 5G access network device 202 to release a radio resource occupied when the electronic device 100 accesses the 5G access network device 202, for example, a radio resource related to each function layer (such as an NR PDCP layer, an NR RLC layer, an NR MAC layer, and an NR PHY) included in an SCG link used for NR connection communication. Take releasing a radio resource related to the NR PHY as an example. Specifically, information such as a downlink received channel, a frequency, and a cell identifier ID may be released.

S1109: The baseband processor 102 releases the NR link, and disables NR measurement.

Specifically, after the 5G access network device 202 releases the radio resource occupied by the electronic device 100, the LTE access network device 201 may notify the baseband processor 102 of the electronic device 100 to release a radio resource occupied on a UE side during NR link configuration, for example, release the radio resource related to the transmission function layer such as the NR PDCP layer, the NR RLC layer, the NR MAC layer, and the NR PHY. Specifically, a related configuration parameter involved in configuring the NR connection on the network side, for example, a parameter such as a frequency or a cell identifier, may be released.

After the baseband processor 202 releases the NR link, the baseband processor 202 may not perform NR measurement. Correspondingly, the network side cannot receive an NR measurement report sent by the UE side.

In a possible implementation, after the baseband processor 202 releases the NR link, the baseband processor 202 performs NR measurement, but does not report the NR measurement report to the LTE access device 202.

S1110: The application processor 101 detects that the electronic device 100 needs to establish the LTE-NR dual connectivity.

For a case in which the electronic device 100 needs to establish the LTE-NR dual connectivity, refer to the description of the high network speed scenario in the foregoing embodiment. Details are not described herein again.

S1111: When detecting that the electronic device 100 needs to establish the LTE-NR dual connectivity, the application processor 101 may send a first instruction to the baseband processor 102. The first instruction may be used to indicate the baseband processor 102 to establish the NR link to the network side device.

Specifically, the first instruction may be a private command message, for example, an attention (attention. AT) command message. Alternatively, the first instruction may be a conventional command message, for example, an at^syscfgex command message used to enable the NR connection, or an at^errccap command used to resume the NR link.

S1112: The baseband processor 102 may enable NR measurement.

Specifically, in response to the first instruction, the baseband processor 102 may measure a plurality of 5G cells in which the electronic device 100 is located.

S1113: The baseband processor 102 may send the first UE assistance information to the LTE access network device 201. The first UE assistance information includes the overheating field. The uplink secondary component carrier count (reducedCCsUL) sub-information element carried in the overheating field is not 0 or the overheating field does not carry any sub-information element.

For specific content, refer to step S906 in the foregoing embodiment shown in FIG. 9. Details are not described herein again.

S1114: After receiving the first UE assistance information, the LTE access network device 201 may initiate the NR connection establishment process with the electronic device 100.

For specific content, refer to step S907 in the foregoing embodiment shown in FIG. 9. Details are not described herein again.

In some network connection scenarios, when an electronic device has disconnected an RRC connection from a network side, if the electronic device resumes establishing the RRC connection after detecting that an NR link is not needed, the electronic device may disable NR measurement and send second UE assistance information to the network side, to indicate that the network side no longer triggers establishing the NR link. Then, if the electronic device detects that an LTE-NR dual connectivity needs to be established, the electronic device may report first UE assistance information to the network side, to trigger the network side to quickly establish the NR link to the electronic device. An uplink component carrier count (reducedCCsUL) sub-information element carried in an overheating field in the first UE assistance information is not 0 or the overheating field does not carry any sub-information element. In this way, when the electronic device detects that the NR link is released, the network side no longer triggers establishing the NR link to the electronic device. When detecting that the LTE-NR dual connectivity is established, the electronic device switches from an LTE single connectivity to the LTE-NR dual connectivity in time, without interrupting a data service, so that a risk of paging loss is reduced.

Figure 12A:
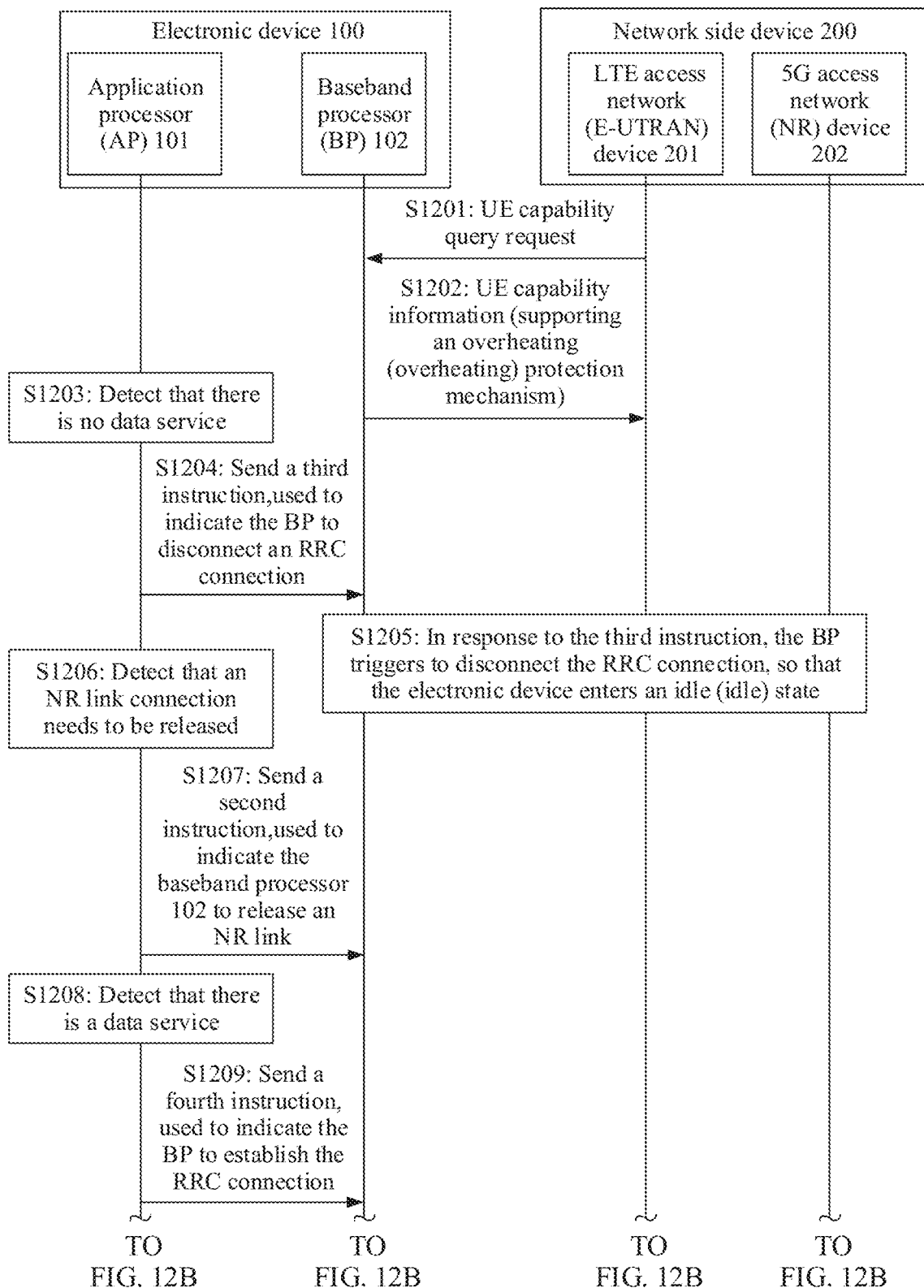
FIG. 12A and FIG. 12B are a schematic diagram of a network connection method according to another embodiment of this application.
Figure 12B:
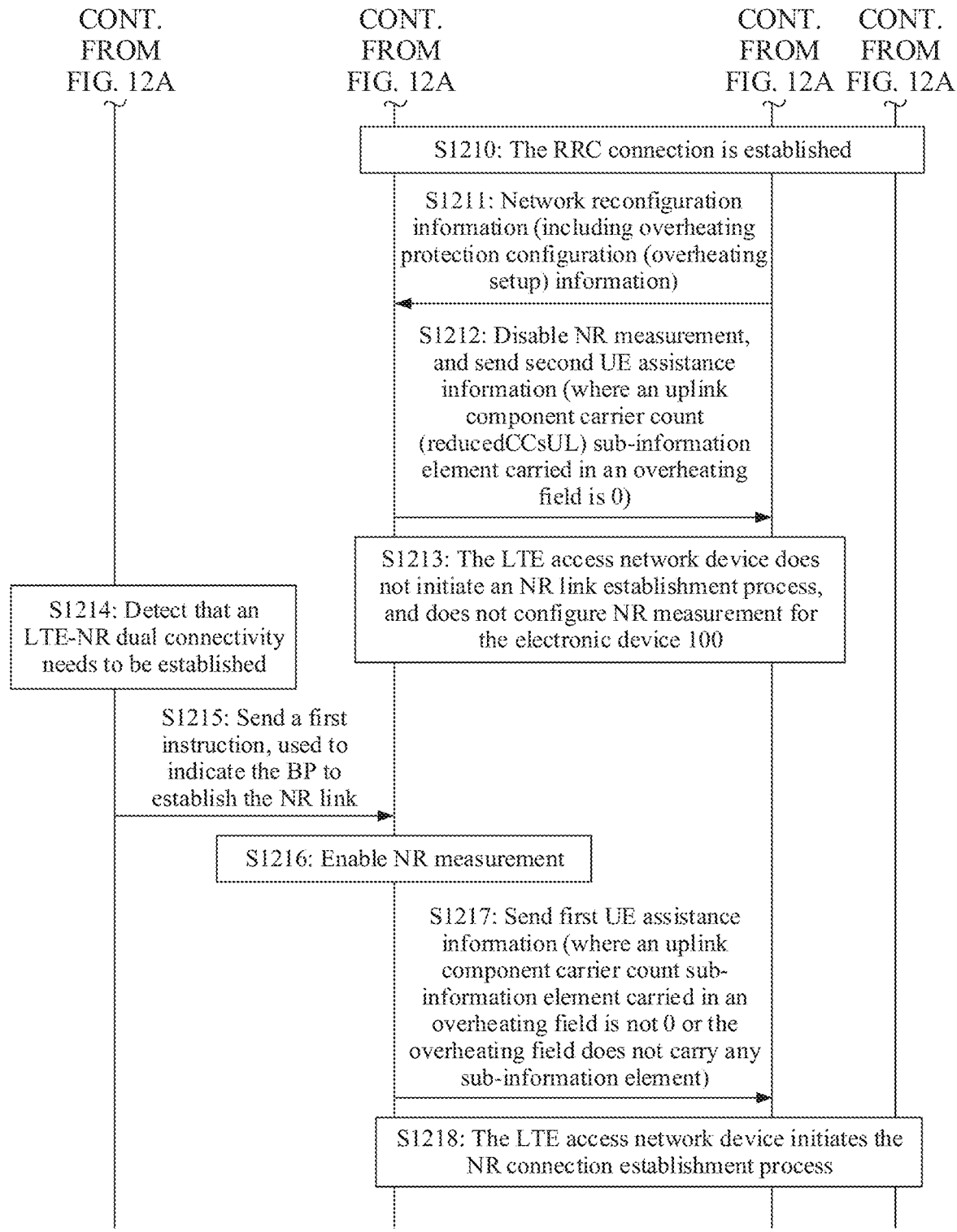

FIG. 12A and FIG. 12B are a schematic diagram of a network connection method according to another embodiment of this application. As shown in 12, an electronic device (UE) 100 may include an application processor (AP) 101 and a baseband processor (baseband processor, BP) 102. The baseband processor 102 may include a modem (modem). A network side device 200 includes an LTE access network (E-UTRAN) device 201 and a 5G access network (NR) device 202. The LTE access network device 201 may be the MeNB in the foregoing embodiment, and the 5G access network (NR) device 202 may be the SeNB in the foregoing embodiment.

As shown in 12, an electronic device (UE) 100 may include an application processor (AP) 101 and a baseband processor (baseband processor, BP) 102. The baseband processor 102 may include a modem (modem). A network side device 200 includes an LTE access network (E-UTRAN) device 201 and a 5G access network (NR) device 202. The LTE access network device 201 may be the MeNB in the foregoing embodiment, and the 5G access network (NR) device 202 may be the SeNB in the foregoing embodiment.

As shown in FIG. 12A and FIG. 12B, the network connection method may include:

S1201: The LTE access network device 201 sends a UE capability query request to the baseband processor 102 of the electronic device 100.

S1202: In response to the UE capability query request, the baseband processor 102 sends UE capability information to the LTE access network device 201. The UE capability information may be used to indicate that the electronic device 100 supports an overheating (overheating) protection mechanism.

S1203: The application processor 201 detects that the electronic device 100 has no data service.

That the electronic device 100 has no data service may include any one of the following: 1. The electronic device 100 disables a mobile data function; 2. the electronic device 100 has no data service within a period of time (for example, 60 s); 3. there is no application running in the electronic device 100, and the like.

S1204: When detecting that the electronic device 100 has no data service, the application processor 201 sends a third instruction to the baseband processor 102. The third instruction is used to indicate the baseband processor 102 to disconnect the RRC connection from the network side device 200.

Specifically, the third instruction may be a private command message, for example, an attention (attention, AT) command message. Alternatively, the third instruction may be a conventional command message, for example, an at^syscfgex command message used to disconnect the RRC connection, or an at^errccap command message used to disconnect the RRC connection.

In a possible case, before the electronic device 100 releases the RRC connection, the electronic device 100 and the network side device 200 are in the LTE-NR dual connectivity. In another possible case, before the network side device 200 and the electronic device 100 release the RRC connection, the electronic device 100 and the network side device 200 are in the LTE single connectivity.

S1205: In response to the third instruction, the baseband processor 102 triggers to disconnect the RRC connection from the network side device 200.

In a possible implementation, when the network side device 200 detects that the electronic device 100 has no data service, the network side device 200 may trigger to release RRC connection to the electronic device 100.

In a possible implementation, when detecting that the electronic device 100 has no data service, the application processor 201 sends the third instruction to the baseband processor 102. In response to the third instruction, the baseband processor 102 may send an RRC release request to the network side device 200. After receiving the RRC release request, in response to the RRC release request, the network side device 200 may trigger to release the RRC connection to the electronic device 100.

After the baseband processor 102 disconnects the RRC connection from the network side device, the electronic device 100 enters an idle (idle) state.

S1206: The application processor 101 of the electronic device 100 detects that the NR link needs to be released.

For a case in which the electronic device 100 needs to release the NR link, refer to the description of the low network speed scenario in the foregoing embodiment. Details are not described herein again.

S1207: When detecting that the NR link needs to be released, the application processor 101 may send a second instruction to the baseband processor 102. The second instruction may be used to indicate the baseband processor 102 to release the NR link.

Specifically, the second instruction may be a private command message, for example, an attention (attention, AT) command message. Alternatively, the second instruction may be a conventional command message, for example, an at^syscfgex command message used to remove an NR capability, or an at^errccap command message used to release the NR link.

S1208: The application processor 201 detects that the electronic device 100 has a data service.

That the electronic device 100 has no data service may include any one of the following: 1. The electronic device 100 enables a mobile data function; 2. the electronic device 100 enables a mobile data function, and the electronic device 100 has no data service within a period of time (for example, 60 s); 3. the electronic device 100 enables a mobile data function, and there is an application running in the electronic device 100; and the like.

S1209: When detecting that the electronic device 100 has no data service, the application processor 201 sends a fourth instruction to the baseband processor 102. The fourth instruction is used to indicate the baseband processor 102 to establish the RRC connection to the network side device 200.

Specifically, the fourth instruction may be a private command message, for example, an attention (attention, AT) command message. Alternatively, the fourth instruction may be a conventional command message, for example, an at^syscfgex command message used to establish the RRC connection, or an at^errccap command message used to establish the RRC connection.

S1210: In response to the fourth instruction, the baseband processor 102 triggers to establish the RRC connection to the network side device 200.

S1211: After establishing the RRC connection to the network side device 200, the baseband processor 102 may send network reconfiguration information to the baseband processor 102. The network reconfiguration information includes overheating protection configuration (overheating setup) information.

For specific content, refer to step S903 in the foregoing embodiment shown in FIG. 9. Details are not described herein again.

S1212: The baseband processor 102 may disable NR measurement, and send the second UE assistance information to the LTE access network device 201. An uplink component carrier count (reducedCCsUL) sub-information element carried in an overheating field in the second UE assistance information is 0.

Before establishing the RRC connection to the network side device 200, the baseband processor 102 receives the second instruction sent by the application processor 101. The second instruction is used to indicate the baseband processor 102 to release the NR link. Therefore, after establishing the RRC connection to the network side device 200, the baseband processor 102 may disable NR measurement, and send the second UE assistance information to the LTE access network device 201.

The overheating field of the second UE assistance information may include a transmission rate level (reducedUE-Category) information element and a maximum component carrier count (reducedMaxCCs) information element. The transmission rate level information element may include a downlink transmission rate level (reducedUE-CategoryDL) sub-information element and an uplink transmission rate level (reducedUE-CategoryUL) sub-information element. The maximum component carrier count (reducedMaxCCs) information element may include a downlink component carrier count (reducedCCsDL) sub-information element and an uplink component carrier count (reducedCCsUL) sub-information element. After receiving the second instruction, the baseband processor 102 may set the uplink component carrier count (reducedCCsUL) sub-information element in the overheating field in the first UE assistance information to 0. For example, even if the baseband processor 102 may measure two uplink secondary component carriers, after receiving the second instruction, the baseband processor 102 may also set the uplink component carrier count (reducedCCsUL) sub-information element in the overheating field in the second UE assistance information to 0, and send the second UE assistance information to the LTE access network device 201.

S1213: After receiving the second UE assistance information, the LTE access network device 201 does not initiate an NR link establishment process, and does not configure NR measurement for the electronic device 100.

In this way, after receiving the second UE assistance information, the network side device 200 may no longer attempt to establish the NR link together with the electronic device 100, thereby saving a network resource and preventing the network side device 200 from actively establishing the NR link to the electronic device 100.

S1214: The application processor 101 detects that the electronic device 100 needs to establish the LTE-NR dual connectivity.

For a case in which the electronic device 100 needs to establish the LTE-NR dual connectivity, refer to the description of the high network speed scenario in the foregoing embodiment. Details are not described herein again.

S1215: When detecting that the electronic device 100 needs to establish the LTE-NR dual connectivity, the application processor 101 may send a first instruction to the baseband processor 102. The first instruction may be used to indicate the baseband processor 102 to resume the NR link.

Specifically, the first instruction may be a private command message, for example, an attention (attention. AT) command message. Alternatively, the first instruction may be a conventional command message, for example, an at^syscfgex command message used to enable an NR connection, or an at^errccap command message used to resume the NR link.

S1216: The baseband processor 102 may enable NR measurement.

Specifically, in response to the first instruction, the baseband processor 102 may measure a plurality of 5G cells in which the electronic device 100 is located.

S1217: The baseband processor 102 may send the first UE assistance information to the LTE access network device 201. The first UE assistance information includes the overheating field. The uplink secondary component carrier count (reducedCCsUL) sub-information element carried in the overheating field is not 0 or the overheating field does not carry any sub-information element.

For specific content, refer to step S906 in the foregoing embodiment shown in FIG. 9. Details are not described herein again.

S1218: After receiving the first UE assistance information, the LTE access network device 201 may initiate the NR connection establishment process with the electronic device 100.

For specific content, refer to step S907 in the foregoing embodiment shown in FIG. 9. Details are not described herein again.

It should be noted that, in the foregoing embodiment of this application, the baseband processor 102 may further indicate, by using other signaling, the network side device 200 to release the NR link or indicate the network side device 200 to establish the LTE-NR dual connectivity.

In a possible implementation, the baseband processor 102 may further indicate, based on a maximum component carrier (maxCC) field in the UE assistance information, the network side device 200 to release the NR link or indicate the network side device 200 to establish the LTE-NR dual connectivity.

The UE assistance information may be different in different protocol versions. For example, in the R16 protocol version, content of an information element of the UE assistance information that carries the maxCC field may be as follows:

```
UE Assistance Information-v16xy-IEs::=SEQUENCE{
  idc-Assistance-r16                IDC-Assistance-r16       OPTIONAL,
  drx-Preference-r16                DRX-Preference-r16       OPTIONAL,
  maxBW-Preference-r16              MaxBW-Preference-r16     OPTIONAL,
  maxCC-Preference-r16              MaxCC-Preference-r16     OPTIONAL,
  minSchedulingOffsetPreference-r16 MinSchedulingOffsetPreference-
    r16
    OPTIONAL,
  releasePreference-r16             RelseasePreference-r16
    OPTIONAL,
  sl-UE-AssistanceInformationNR-r16 SL-UE-AssistanceInformationNR-
    r16
    OPTIONAL,
  nonCriticalExtension              SEQUENCE{ }
    OPTIONAL,
}
```

The UE assistance information may include a maximum secondary component carrier count (maxCC) field and other fields, for example, an idc field, a discontinuous reception (drx) field, a maximum bandwidth (maxBW) field, a maximum MIMO count (maxMIMO) field, a minSchedulingOffset field, a release field, and an sl-UE-Assistance InformationNR field. "Preference" in the name of the maxCC field indicates that the maxCC field may be a preference setting on a UE side, and the network side does not necessarily accept a secondary component carrier setting indicated by the maxCC field. For example, after receiving the UE assistance information, the network side may set a corresponding secondary component carrier for the UE side based on a secondary component carrier count indicated by the maxCC field, or may ignore the maxCC field.

Information element content of the overheating field in the UE assistance information may be as follows:

```
"MaxCC-preference-r16::=   SEQUENCE{
reducedCCsDL-r16           INTEGER{0..31},
reducedCCsUL-r16           INTEGER{0..31},
}"
```

The maxCC field of the UE assistance information may include a downlink secondary component carrier count (reducedCCsDL) sub-information element and an uplink secondary component carrier count (reducedCCsUL) sub-information element. A value of the downlink secondary component carrier count (reducedCCsDL) sub-information element may be an integer from 0 to 31. A value of the uplink secondary component carrier count (reducedCCsUL) sub-information element may be an integer from 0 to 31.

It should be noted that the maxCC field may be based on the 3GPP R16 protocol version, but is not limited to the 3GPP R16 protocol version, or may be based on a protocol of another version.

When the value of the uplink secondary component carrier count (reducedCCsUL) sub-information element in the maxCC field in the UE assistance information reported by the electronic device to the network side device is a, a is greater than or equal to 0. The network side device may activate the a uplink secondary component carrier for the electronic device based on a. The electronic device may send data and send an uplink reference signal on a physical uplink shared channel (physical uplink shared channel, PUSCH) on the a activated uplink secondary component carrier. The electronic device may send neither data nor an uplink reference signal on a physical uplink shared channel (physical uplink shared channel, PUSCH) on another inactivated uplink secondary component carrier.

For example, when the application processor 101 detects that the electronic device 100 needs to establish the LTE-NR dual connectivity, the application processor 101 may send the first instruction to the baseband processor 102. The first instruction may be used to indicate the baseband processor 102 to establish the NR link to the network side device 200. In response to the first instruction, the baseband processor 102 may send third UE assistance information to the access network device 200. An uplink component carrier count (reducedCCsUL) sub-information element in a maxCC field in the third UE assistance information is not 0 or the third UE assistance information does not carry any sub-information element.

When the application processor 101 detects that the electronic device 100 needs to release the NR link, the application processor 101 may send the second instruction to the baseband processor 102. The second instruction may be used to indicate the baseband processor 102 to release the NR link that is established to the network side device 200. In response to the second instruction, the baseband processor 102 may send fourth UE assistance information to the access network device 200. An uplink component carrier count (reducedCCsUL) sub-information element carried in a maxCC field in the fourth UE assistance information is 0.

In a possible implementation, the baseband processor 102 may further set a special field in the UE assistance information to indicate the network side device 200 to release the NR link or indicate the network side device 200 to establish the LTE-NR dual connectivity. The special field occupies one bit (bit).

For example, when a value of the special field in the UE assistance information is 1, the UE assistance information may be used to indicate the network side device 200 to establish the LTE-NR dual connectivity. When the value of the special field in the UE assistance information is 0, the UE assistance information may be used to indicate the network side device 200 to release the NR link.

In a possible implementation, the baseband processor 102 may further indicate, by using other RRC signaling, the network side device 200 to release the NR link or indicate the network side device 200 to establish the LTE-NR dual connectivity.

The following describes a schematic diagram of a structure of an electronic device 100 according to an embodiment of this application.

Figure 13:
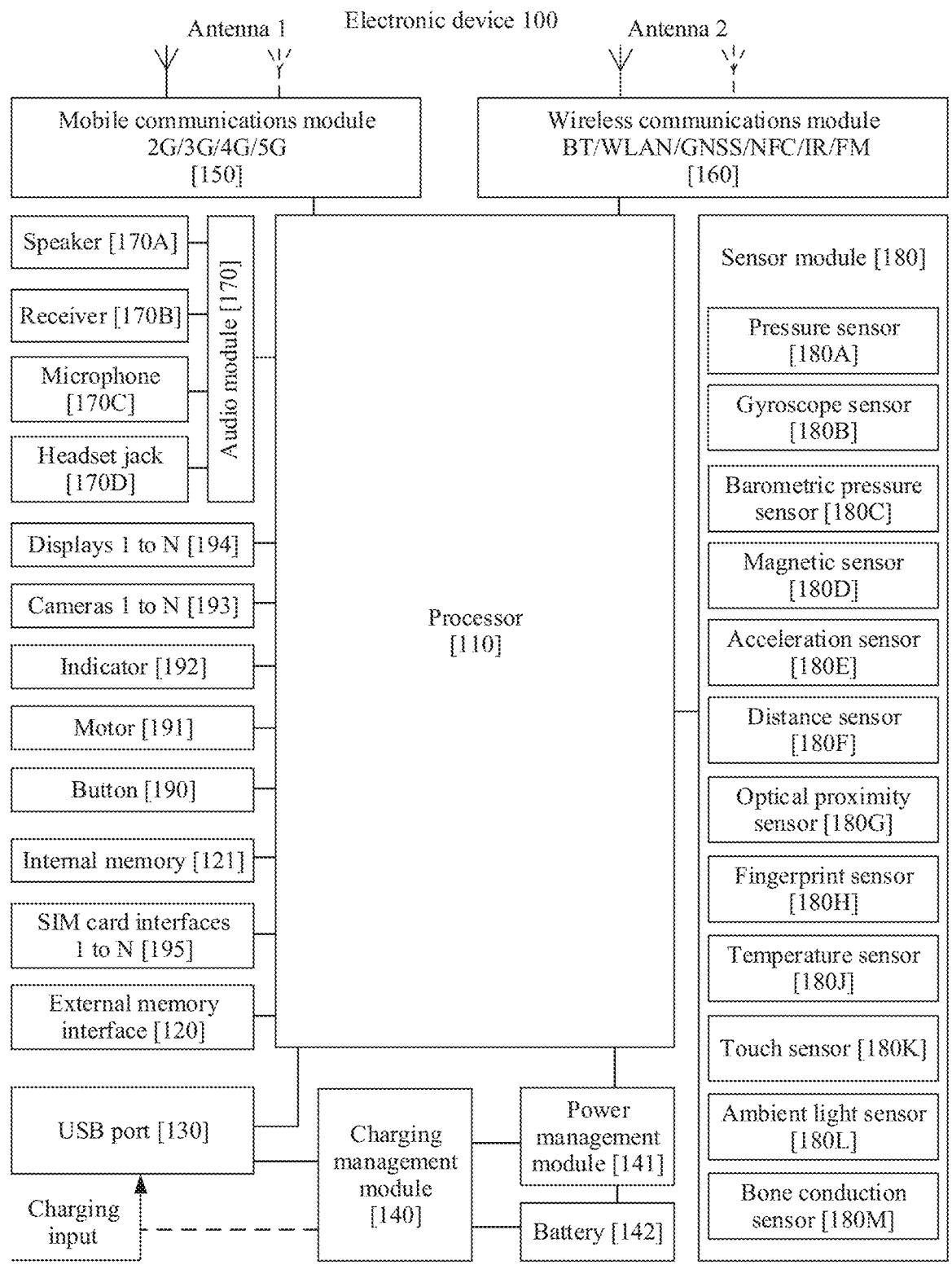
FIG. 13 is a schematic diagram of a structure of an electronic device according to an embodiment of this application.

FIG. 13 is a schematic diagram of the structure of the electronic device 100.

The electronic device 100 is used as an example below to describe embodiments in detail. It should be understood that the electronic device 100 shown in FIG. 13 is merely an example, and the electronic device 100 may have more or fewer components than those shown in FIG. 13, or may combine two or more components, or may have different component configurations. Components shown in FIG. 13 may be implemented by hardware, software, or a combination of hardware and software that includes one or more signal processing and/or application-specific integrated circuits.

The electronic device 100 may include a processor 110, an external memory interface 120, an internal memory 121, a universal serial bus (universal serial bus, USB) port 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator

192, a camera 193, a display 194, a subscriber identity module (subscriber identity module, SIM) card interface 195, and the like. The sensor module 180 may include one or more of a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of the present invention does not constitute a specific limitation on the electronic device 100. In some other embodiments of this application, the electronic device 100 may include more or fewer components than those shown in the figure, or combine some components, or split some components, or have different component arrangements. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit. GPU), an image signal processor (image signal processor, ISP), a controller, a memory, a video codec, a digital signal processor (digital signal processor, DSP), a baseband processor, a neural network processing unit (neural network processing unit, NPU), and/or the like. Different processing units may be independent components, or may be integrated into one or more processors.

The controller may be a nerve center and a command center of the electronic device 100. The controller may generate an operation control signal based on instruction operation code and a time sequence signal, to control instruction fetching and instruction execution.

A memory may further be disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor 110 may directly invoke the instructions or the data from the memory. This avoids repeated access and reduces a waiting time of the processor 110, thereby improving system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation. PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) port, and/or the like.

The charging management module 140 is configured to receive a charging input from a charger.

A wireless communication function of the electronic device 100 may be implemented through the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the electronic device 100 may be configured to cover one or more communications frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communications module 150 can provide a solution, applied to the electronic device 100, to wireless communication including 2G, 3G, 4G, 5G, and the like. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering or amplification on the received electromagnetic wave, and transmit a processed electromagnetic wave to the modem processor for demodulation. The mobile communications module 150 may further amplify a signal modulated by the modem processor, and convert an amplified signal into an electromagnetic wave for radiation through the antenna 1. In some embodiments, at least some function modules in the mobile communications module 150 may be disposed in the processor 110. In some embodiments, at least some function modules in the mobile communications module 150 may be disposed in a same device as at least some modules in the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by using an audio device (which is not limited to the speaker 170A, the receiver 170B, or the like), or displays an image or a video by using the display 194. In some embodiments, the modem processor may be an independent component. In some other embodiments, the modem processor may be independent of the processor 110, and is disposed in a same device as the mobile communications module 150 or another function module.

The wireless communications module 160 may provide a solution, applied to the electronic device 100, to wireless communication including a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, and the like. The wireless communications module 160 may be one or more components integrating at least one communications processing module. The wireless communications module 160 receives an electromagnetic wave through the antenna 2, performs frequency modulation and filtering processing on the electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

In some embodiments, in the electronic device 100, the antenna 1 and the mobile communications module 150 are coupled, and the antenna 2 and the wireless communications module 160 are coupled, so that the electronic device 100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system. QZSS), and/or a satellite based augmentation system (satellite based augmentation system, SBAS).

The electronic device 100 may implement a display function by using the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs that execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode. OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diode, QLED), or the like. In some embodiments, the electronic device 100 may include one or N displays 194, where N is a positive integer greater than 1.

The electronic device 100 may implement a photographing function by using the ISP, the camera 193, the video codec, the GPU, the display 194, the application processor, and the like.

The external memory interface 120 may be configured to connect to an external memory card, for example, a micro SD card, to extend a storage capability of the electronic device 100. The internal memory 121 may be configured to store computer-executable program code. The executable program code includes instructions. The processor 110 runs the instructions stored in the internal memory 121 to perform various function applications of the electronic device 100 and data processing. The internal memory 121 may include a program storage area and a data storage area. The program storage area may store an operating system, an application required by at least one function (for example, a sound playing function or an image playing function), and the like. The data storage area may store data (for example, audio data and a phone book) and the like created in a use process of the electronic device 100. In addition, the internal memory 121 may include a high-speed random access memory, and may further include a nonvolatile memory such as at least one disk storage device, a flash memory, or a universal flash storage (universal flash storage, UFS).

The electronic device 100 may implement an audio function by using the audio module 170, the speaker 170A, the receiver 170B, the microphone 170C, the headset jack 170D, the application processor, and the like. The audio module 170 is configured to convert digital audio information into an analog audio signal for output, and is also configured to convert an analog audio input into a digital audio signal. The speaker 170A, also referred to as a "horn", is configured to convert an audio electrical signal into a sound signal. The electronic device 100 may listen to music or answer a call in a hands-free mode by using the speaker 170A. The receiver 170B, also referred to as an "earpiece", is configured to convert an audio electrical signal into a sound signal. The microphone 170C, also referred to as a "mike" or a "microphone", is configured to convert a sound signal into an electrical signal. The headset jack 170D is configured to connect to a wired headset. The pressure sensor 180A is configured to sense a pressure signal, and can convert the pressure signal into an electrical signal. In some embodiments, the pressure sensor 180A may be disposed on the display 194. The gyroscope sensor 180B may be configured to determine a motion posture of the electronic device 100. The barometric pressure sensor 180C is configured to measure barometric pressure. The magnetic sensor 180D includes a Hall effect sensor. The acceleration sensor 180E may detect accelerations in various directions (usually on three axes) of the electronic device 100. The distance sensor 180F is configured to measure a distance. The electronic device 100 may measure a distance in an infrared manner or a laser manner. The optical proximity sensor 180G may include, for example, a light-emitting diode (LED) and an optical detector, for example, a photodiode. The ambient light sensor 180L is configured to sense ambient light brightness. The fingerprint sensor 180H is configured to collect a fingerprint. The temperature sensor 180J is configured to detect a temperature. The touch sensor 180K is also referred to as a "touch panel". The touch sensor 180K may be disposed on the display 194, and the touch sensor 180K and the display 194 constitute a touchscreen, which is also referred to as a "touchscreen". The touch sensor 180K is configured to detect a touch operation performed on or near the touch sensor 180K. The touch sensor may transfer the detected touch operation to the application processor to determine a type of the touch event. The display 194 may provide a visual output related to the touch operation. In some other embodiments, the touch sensor 180K may alternatively be disposed on a surface of the electronic device 100 at a location different from that of the display 194. The bone conduction sensor 180M may obtain a vibration signal. The button 190 includes a power button, a volume button, and the like. The motor 191 may generate a vibration prompt. The indicator 192 may be an indicator light, and may be configured to indicate a charging status and a power change, or may be configured to indicate a message, a missed call, a notification, and the like. The SIM card interface 195 is configured to connect to a SIM card.

Figure 14:
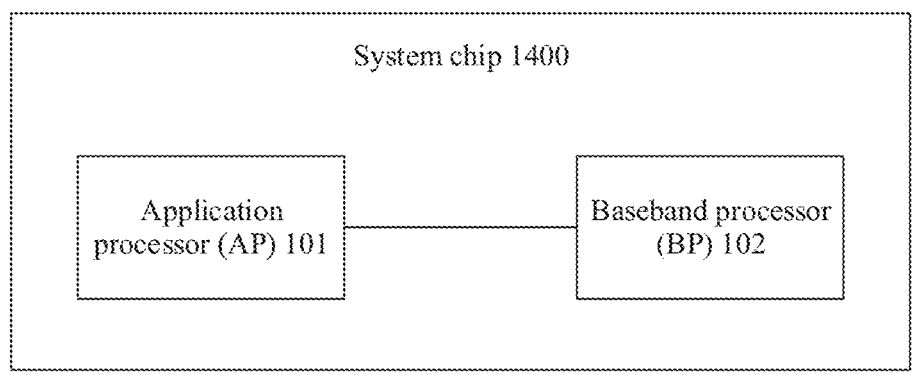
FIG. 14 is a schematic diagram of a structure of a chip system according to an embodiment of this application.

FIG. 14 shows a chip system 1400 according to an embodiment of this application. The chip system 1400 may include an application processor (application processor, AP) 101 and a baseband processor (baseband processor. BP) 102.

During actual application, software that can be run by the application processor 101 usually includes an operating system, a user interface, an application, and the like. The baseband processor 102 may be considered as a wireless modem (modem) module, and is responsible for coordinating and controlling communication between the 102 and each of a base station and the 101. Software that can be run by the BP includes communication control software of a baseband modem (baseband modem), and the like.

A preset interface technology can be for implementing mutual communication between the application processor 101 and the baseband processor 102. The interface technology may be customized by a system. For example, the interface technology includes but is not limited to a serial peripheral interface (serial peripheral interface, SPI), a universal asynchronous receiver/transmitter (universal asynchronous receiver/transmitter, UART), a universal serial bus (universal serial bus, USB), a general-purpose input/output (general purpose input/output, GPIO) control pin, and the like. Specifically, communication transmission between the application processor and the baseband processor may be implemented by using a control command in a message format, to implement functions such as a call, a short message service message, and mobile network access. The control command may include a conventional AT (attention) command, a mobile broadband interface model (mobile broadband interface model, MBIM) command, another protocol command supporting mutual transmission between the 101 and the 102, or the like.

The baseband processor 102 supports running of protocol software related to a non-access NAS stratum and a radio resource control RRC layer. During actual application, the application processor 101 supports communication with the NAS and the RRC layer in the baseband processor 102. For example, in this application, the application processor 101 may send a corresponding signaling message to the NAS by using the conventional AT command, to notify the NAS of information such as an application status or a device screen status that is learned of by the 101 currently.

For method processes performed by the application processor 101 and the baseband processor 102 in this embodiment of this application, refer to the method embodiments shown in FIG. 9 to FIG. 12A and FIG. 12B. Details are not described herein again.

During actual application, the chip system 1400 usually is a highly complex system chip, for example, an SOC chip. During actual deployment, the chip system may be deployed inside a device, or may be deployed outside the device, and the device is controlled through a wired connection or a wireless connection. The device includes but is not limited to user equipment UE or a terminal device. For example, the device may specifically include a smartphone, a mobile internet device (mobile internet device, MID), a wearable smart device, another device that supports network communication, or the like.

An embodiment of this application further provides a computer-readable storage medium. The computer-readable storage medium stores instructions. When the instructions are run on a processor, processes in any one of the method embodiments in FIG. 9 to FIG. 12A and FIG. 12B may be implemented.

An embodiment of this application further provides a computer program product. When the computer program product runs on a processor, processes in any one of the method embodiments in FIG. 9 to FIG. 12A and FIG. 12B may be implemented.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. An electronic device, comprising:
a memory configured to store instructions; and
a processor coupled to the memory and configured to execute the instructions to:
perform first data exchange with a network side device through a Long-Term Evolution (LTE) link;
send, when detecting that the electronic device has no data service, radio resource control (RRC) connection release signaling to the network side device, wherein the RRC connection release signaling instructs the network side device to disconnect an RRC connection from the electronic device;
disconnect the RRC connection from the network side device;
send, when the electronic device meets a second preset condition and detects that the electronic device has the data service, RRC connection setup signaling to the network side device, wherein the RRC connection setup signaling instructs the network side device to establish the RRC connection to the electronic device;
establish the RRC connection to the network side device;
disable NR measurement;
send second UE assistance information to the network side device, wherein a second reducedCCsUL sub-information element in the second UE assistance information is 0;
perform third data exchange with the network side device through the LTE link;
actively send first user equipment (UE) assistance information to the network side device when the electronic device meets a first preset condition, wherein the first user equipment UE assistance information comprises a first field, wherein a first uplink secondary component carrier count (reducedCCsUL) sub-information element carried in the first field is a first value or the first field does not carry any sub-information element, and wherein the first value is greater than 0;
establish a New Radio (NR) link to the network side device; and
perform second data exchange with the network side device through both the LTE link and the NR link.

2. The electronic device of claim 1, wherein a protocol version of the first UE assistance information is a $3^{rd}$ Generation Partnership Project (3GPP) technical protocol specification R14 version or R15 version, and wherein the first field is an overheating protection field.

3. The electronic device of claim 1, wherein a protocol version of the first UE assistance information is a $3^{rd}$ Generation Partnership Project (3GPP) technical protocol specification R16 version, and wherein the first field is a maximum secondary component carrier count (maxCC) field.

4. The electronic device of claim 1, wherein the processor is further configured to execute the instructions to perform the second data exchange with the network side device through both the LTE link and the NR link by sending data to the network side device by using both an uplink primary component carrier on the LTE link and N uplink secondary component carriers activated by the network side device on the NR link, and wherein N is the first value.

5. The electronic device of claim 1, wherein the processor is further configured to execute the instructions to:
perform the second data exchange with the network side device through both the LTE link and the NR link before performing the first data exchange with the network side device through the LTE link;
actively send secondary cell group (SCG) failure signaling to the network side device when the electronic device meets a second preset condition;
release the NR link to the network side device; and
disable NR measurement.

6. The electronic device of claim 2, wherein the processor is further configured to execute the instructions to:
perform the second data exchange with the network side device through both the LTE link and the NR link before performing the first data exchange with the network side device through the LTE link;
actively send second UE assistance information to the network side device when the electronic device meets a second preset condition, wherein the second UE assistance information comprises the overheating protection field, and wherein a second reducedCCsUL sub-information element carried in the overheating protection field is 0;
release the NR link to the network side device; and
disable NR measurement.

7. The electronic device of claim 3, wherein the processor is further configured to execute the instructions to:
perform the second data exchange with the network side device through both the LTE link and the NR link before performing the first data exchange with the network side device through the LTE link;
actively send second UE assistance information to the network side device when the electronic device meets a second preset condition, wherein the second UE assistance information comprises the maxCC field, and wherein a second reducedCCsUL sub-information element carried in the maxCC field is 0;
release the NR link to the network side device; and
disable NR measurement.

8. The electronic device of claim 2, wherein the processor is further configured to execute the instructions to:
receive a UE capability query request from the network side device before sending the first UE assistance information to the network side device;
send, in response to the UE capability query request, UE capability information to the network side device, wherein the UE capability information indicates that the electronic device supports an overheating mechanism;
receive network reconfiguration information from the network side device, wherein the network reconfiguration information comprises overheating configuration information; and
execute, in response to the network reconfiguration information, configuration content in the overheating configuration information.

9. The electronic device of claim 1, wherein the first preset condition comprises:
the electronic device turns on a screen;
the electronic device turns on the screen, and a data transmission rate between the electronic device and the network side device is greater than a first preset rate;
the electronic device turns on the screen, and a first size of a first data packet that needs to be transmitted by the electronic device is greater than a first preset threshold;
a device temperature of the electronic device is greater than or equal to a preset temperature threshold;
the electronic device turns off the screen, and the data transmission rate is greater than a second preset rate; or
the electronic device turns off the screen, and a second size of a second data packet transmitted between the electronic device and the network side device is greater than a second preset threshold.

10. The electronic device of claim 5, wherein the second preset condition comprises:
the electronic device turns off a screen;
the electronic device turns on the screen, and a data transmission rate between the electronic device and the network side device is less than or equal to a first preset rate;
the electronic device turns on the screen, and a first size of a first data packet that needs to be transmitted by the electronic device is less than or equal to a first preset threshold;
a device temperature of the electronic device is greater than or equal to a preset temperature threshold;
the electronic device turns off the screen, and the data transmission rate is less than or equal to a second preset rate; or
the electronic device turns off the screen, and a second size of a second data packet transmitted between the electronic device and the network side device is greater than a second preset threshold.

11. A chip system implemented by an electronic device, wherein the chip system comprises:
an application processor (AP) configured to:
send a first instruction when the electronic device meets a first preset condition;
send a second instruction to a baseband processor when the electronic device meets a second preset condition;
before sending the first instruction to the baseband processor and when detecting that the electronic device has no data service, send a third instruction to the baseband processor; and
send a fourth instruction to the baseband processor when detecting that the electronic device has a data service; and
the baseband processor, wherein the baseband processor is coupled to the AP and configured to:
perform first data exchange with a network side device through a Long-Term Evolution (LTE) link;
receive the first instruction from the AP;
actively send, in response to the first instruction, first user equipment (UE) assistance information to the network side device, wherein the first user equipment UE assistance information comprises a first field, wherein a first uplink secondary component carrier count (reducedCCsUL) sub-information element carried in the first field is a first value or the first field does not carry any sub-information element, and wherein the first value is greater than 0;
establish a new radio (NR) link to the network side device;
perform second data exchange with the network side device through both the LTE link and the NR link;
in response to the second instruction, disable NR measurement, send second UE assistance information to the network side device, wherein a second reducedCCsUL sub-information element in the second UE assistance information is 0, and perform third data exchange with the network side device through the LTE link;

in response to the third instruction, send radio resource control (RRC) connection release signaling to the network side device, wherein the RRC connection release signaling instructs the network side device to disconnect an RRC connection from the electronic device, and disconnect the RRC connection from the network side device; and in response to the fourth instruction, send RRC connection setup signaling to the network side device, wherein the RRC connection setup signaling instructs the network side device to establish the RRC connection to the electronic device, and establish the RRC connection to the network side device.

12. The chip system of claim 11, wherein a protocol version of the first UE assistance information is a $3^{rd}$ Generation Partnership Project (3GPP) technical protocol specification R14 version or R15 version, and wherein the first field is an overheating protection field.

13. The chip system of claim 11, wherein a protocol version of the first UE assistance information is a $3^{rd}$ Generation Partnership Project (3GPP) technical protocol specification R16 version, and wherein the first field is a maximum secondary component carrier count (maxCC) field.

14. The chip system of claim 11, wherein the baseband processor is further configured to send data to the network side device by using both an uplink primary component carrier on the LTE link and N uplink secondary component carriers activated by the network side device on the NR link, and wherein N is the first value.

15. The chip system of claim 11, wherein the AP is further configured to send a second instruction to the baseband processor when the electronic device meets a second preset condition, and wherein the baseband processor is further configured to:

perform the second data exchange with the network side device through both the LTE link and the NR link before performing the first data exchange with the network side device through the LTE link;

actively send, in response to the second instruction, secondary cell group (SCG) failure signaling to the network side device;

release the NR link to the network side device; and disable NR measurement.

16. The chip system of claim 12, wherein the AP is further configured to send a second instruction to the baseband processor when the electronic device meets a second preset condition, and wherein the baseband processor is further configured to:

perform the second data exchange with the network side device through both the LTE link and the NR link before performing the first data exchange with the network side device through the LTE link;

actively send, in response to the second instruction, second UE assistance information to the network side device, wherein the second UE assistance information comprises the overheating protection field, and wherein a second reducedCCsUL sub-information element carried in the overheating protection field is 0;

release the NR link to the network side device; and disable NR measurement.

17. The chip system of claim 13, wherein the AP is further configured to send a second instruction to the baseband processor when the electronic device meets a second preset condition, and wherein the baseband processor is further configured to:

perform the second data exchange with the network side device through both the LTE link and the NR link before performing the first data exchange with the network side device through the LTE link;

actively send, in response to the second instruction, second UE assistance information to the network side device, wherein the second UE assistance information comprises the maxCC field, and wherein a second reducedCCsUL sub-information element carried in the maxCC field is 0;

release the NR link to the network side device; and disable NR measurement.

18. The chip system of claim 12, wherein the baseband processor is further configured to:

receive a UE capability query request from the network side device before sending the first UE assistance information to the network side device;

send, in response to the UE capability query request, UE capability information to the network side device, wherein the UE capability information indicates that the electronic device supports an overheating mechanism;

receive network reconfiguration information from the network side device, wherein the network reconfiguration information comprises overheating configuration information; and execute, in response to the network reconfiguration information, configuration content in the overheating configuration information.

19. An electronic device, comprising:

a memory configured to store instructions; and a processor coupled to the memory and configured to execute the instructions to:

perform first data exchange with a network side device through a Long-Term Evolution (LTE) link;

actively send first user equipment (UE) assistance information to the network side device when the electronic device meets a first preset condition, wherein the first user equipment UE assistance information comprises a first field, wherein a first uplink secondary component carrier count (reducedCCsUL) sub-information element carried in the first field is a first value or the first field does not carry any sub-information element, wherein the first value is greater than 0, and wherein the first preset condition comprises:

the electronic device turns on a screen;

the electronic device turns on the screen, and a data transmission rate between the electronic device and the network side device is greater than a first preset rate;

the electronic device turns on the screen, and a first size of a first data packet that needs to be transmitted by the electronic device is greater than a first preset threshold;

a device temperature of the electronic device is greater than or equal to a preset temperature threshold;

the electronic device turns off the screen, and the data transmission rate is greater than a second preset rate; or the electronic device turns off the screen, and a second size of a second data packet transmitted between the electronic device and the network side device is greater than a second preset threshold;

establish a New Radio (NR) link to the network side device; and perform second data exchange with the network side device through both the LTE link and the NR link.

20. The electronic device of claim 19, wherein a protocol version of the first UE assistance information is a $3^{rd}$ Generation Partnership Project (3GPP) technical protocol specification R14 version or R15 version, and wherein the first field is an overheating protection field.

21. The electronic device of claim 19, wherein a protocol version of the first UE assistance information is a $3^{rd}$ Generation Partnership Project (3GPP) technical protocol specification R16 version, and wherein the first field is a maximum secondary component carrier count (maxCC) field.

* * * * *